United States Patent
Canton et al.

(10) Patent No.: US 10,515,145 B2
(45) Date of Patent: Dec. 24, 2019

(54) PARAMETERIZING AND WORKING WITH MATH EQUATIONS IN A SPREADSHEET APPLICATION

(71) Applicant: Microsoft Technology Licensing, LLC, Redmond, WA (US)

(72) Inventors: Christian Canton, Bellevue, WA (US); John Campbell, Woodinville, WA (US); Catherine Harley, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

(21) Appl. No.: 15/395,667

(22) Filed: Dec. 30, 2016

(65) Prior Publication Data

US 2017/0220543 A1 Aug. 3, 2017

Related U.S. Application Data

(60) Provisional application No. 62/289,771, filed on Feb. 1, 2016.

(51) Int. Cl.
| | |
|---|---|
| *G06F 17/24* | (2006.01) |
| *G06F 17/21* | (2006.01) |
| *G06F 17/27* | (2006.01) |
| *G06F 17/22* | (2006.01) |

(52) U.S. Cl.
CPC .......... *G06F 17/246* (2013.01); *G06F 17/215* (2013.01); *G06F 17/2264* (2013.01); *G06F 17/2705* (2013.01)

(58) Field of Classification Search
CPC . G06F 17/246; G06F 17/2264; G06F 17/2705
See application file for complete search history.

(56) References Cited

U.S. PATENT DOCUMENTS

| | | | |
|---|---|---|---|
| 5,848,187 A | 12/1998 | Bricklin et al. | |
| 6,138,130 A | 10/2000 | Adler et al. | |
| 6,377,965 B1 | 4/2002 | Hachamovitch et al. | |
| 6,460,059 B1* | 10/2002 | Wisniewski | G06F 17/246 |
| | | | 715/205 |
| 6,640,234 B1 | 10/2003 | Coffen | |
| 7,350,141 B2 | 3/2008 | Kotler et al. | |
| 7,698,638 B2 | 4/2010 | Sargent, III et al. | |

(Continued)

OTHER PUBLICATIONS

PCT International Search Report in PCT/US2016/060025, dated Apr. 7, 2017, 23 pages.

(Continued)

*Primary Examiner* — Scott T Baderman
*Assistant Examiner* — Mario M Velez-Lopez

(57) ABSTRACT

The present disclosure is directed to a spreadsheet application with an enhanced understanding of mathematical equations using a mathematical engine and a calculation engine. The disclosed spreadsheet application has many enhanced features, such as, but not limited to: analyzing complex equations, identifying dependencies, converting mathematical notation to spreadsheet notation, connecting variables in an equation to other cells of the spreadsheet, solving or simplifying equations, recommending different display representations of data, and a providing a math display mode.

20 Claims, 30 Drawing Sheets

(56) References Cited

U.S. PATENT DOCUMENTS

| | | | |
|---|---|---|---|
| 7,962,436 | B2 | 6/2011 | Brelage et al. |
| 8,091,024 | B2 | 1/2012 | Graeber |
| 8,166,385 | B2 | 4/2012 | Garcia-Molina et al. |
| 8,510,650 | B2 | 8/2013 | Garland et al. |
| 9,020,999 | B2 | 4/2015 | Rai |
| 9,892,108 | B1* | 2/2018 | Ghaddar ............... G06F 17/246 |
| 2002/0091871 | A1 | 7/2002 | Cahill et al. |
| 2003/0033329 | A1 | 2/2003 | Bergman et al. |
| 2003/0056181 | A1 | 3/2003 | Marathe |
| 2006/0179012 | A1 | 8/2006 | Jacobs |
| 2006/0212469 | A1 | 9/2006 | Babanov et al. |
| 2007/0136652 | A1 | 6/2007 | Ellis et al. |
| 2007/0244672 | A1 | 10/2007 | Kjaer |
| 2007/0266315 | A1* | 11/2007 | Bernardin ............. G06F 17/215 715/210 |
| 2009/0006466 | A1* | 1/2009 | Ellis ....................... G06F 17/246 |
| 2010/0083089 | A1* | 4/2010 | Rapp ..................... G06F 17/246 715/217 |
| 2010/0161471 | A1* | 6/2010 | Fendick ................. G06Q 40/00 705/35 |
| 2012/0324421 | A1 | 12/2012 | Boeckenhauer et al. |
| 2013/0036346 | A1 | 2/2013 | Cicerone |
| 2013/0067305 | A1* | 3/2013 | Golan ................... G06F 17/246 715/219 |
| 2013/0110884 | A1* | 5/2013 | Eakins ................. G06F 17/2264 707/809 |
| 2013/0254111 | A1* | 9/2013 | Gonser ............... G06Q 20/3825 705/44 |
| 2014/0082471 | A1* | 3/2014 | Katouli ................. G06F 3/0488 715/224 |
| 2014/0122516 | A1 | 5/2014 | Brewer et al. |
| 2014/0149838 | A1 | 5/2014 | Bedard et al. |
| 2014/0173400 | A1* | 6/2014 | Mingot ................... G06F 16/95 715/212 |
| 2014/0372849 | A1 | 12/2014 | Freedman et al. |
| 2014/0372857 | A1 | 12/2014 | Otero et al. |
| 2014/0372952 | A1 | 12/2014 | Otero et al. |
| 2015/0142418 | A1 | 5/2015 | Byron |
| 2016/0028790 | A1* | 1/2016 | Eriksson ................. H04L 67/02 709/219 |
| 2016/0070733 | A1 | 3/2016 | Gould |
| 2017/0124049 | A1 | 5/2017 | Campbell et al. |
| 2017/0124050 | A1 | 5/2017 | Campbell et al. |
| 2017/0337040 | A1 | 11/2017 | Salvi et al. |

OTHER PUBLICATIONS

Abdali, "Spreadsheet Computations in Computer Algebra", Sigsam Bulletin, 1987, pp. 11-16.

Bredenkamp, "Use of Spreadsheets in electrical engineering" IEEE Circuits and Devices Magazine, IEEE, Service Center, Piscataway NJ, US, vol. 3, No. 5, 1987-09.

De Hoon et al., "FunSheet: A Functional Spreadsheet", 1996, pp. 1-20, https://www.researchgate.net/profile/Marko_Eekelen/publication/2243431_FunSheet_A_Functional_Spreadsheet_links/09e4150ad3d34ad552000000/FunSheet-A-Functinoal-Spreadsheet.pdf.

PCT International Search Report in PCT/US2017/016038, dated Apr. 11, 2017, 15 pages.

Tabach et al., "Understanding Equivalence of Symbolic Expressions in a Spreadsheet-Based Environment", International Journal of Coputers for Mathematical Learning, Kluwer Academic Publishers, vol. 13, No. 1, Jan. 30, 2008, pp. 27-46.

Van Eekelen et al, "Constructing medium sized efficient functional programs in Clean", May 24, 1995, Advanced Functional Programming, Springer Berlin, pp. 186-188 and 192-194.

"FormulaView Help", Published on: Feb. 10, 2015, 9 pages, available at: http://formulaforge.com/formulaview-help/.

"Infty Project ", Published on: Jan. 18, 2006, 3 pages, available at: http://www.inftyproject.org/en/index.html.

"Parameterizing, and working with math equations in Spreadsheet Application", Feb. 1, 2016, 23 pages.

"Use Equation Editor in Excel 2007 for Windows", Retrieved on: Feb. 24, 2016, 3 pages, available at: https://support.office.com/en-us/article/Use-Equation-Editor-in-Excel-2007-for-Windows-771c7a8b-4b3d-4ab8-982a-8ab22f1212ce.

"Use Math Input Panel to write and correct math equations", Published on: Oct. 5, 2010, 3 pages, available at: http://windows.microsoft.com/en-in/windows7/use-math-input-panel-to-write-and-correct-math-equations.

An Introduction to Data Validation in Excel, Published on: Mar. 15, 2014, http://trumpexcel.com/2014/03/learn-all-about-data-validation-in-excel/, 4 pages.

Canton et al., "Rich Data Types", Jul. 30, 2015, 217 pages.

Create an Excel Drop Down list with Search Suggestions, Published on: Oct. 19, 2013, http://trumpexcel.com/2013/10/excel-drop-down-list-with-search-suggestions/, 11 pages.

French, Ted, "Convert Measurements in Excel", Published on: Mar. 18, 2011, http://spreadsheets.about.com/od/excel2010functions/ss/2011-03-18-Convert-Measurements-In-Excel-2010.htm, 4 pages.

Hoydahl, Jan, "Cominvent AS—Enterprise Search Consultants", Published on: Jan. 25, 2012, http://www.cominvent.com/2012/01/25/super-flexible-autocomplete-with-solr/, 4 pages.

In-Cell Dropdown and Validation in Spreadsheets, Published on: Aug. 26, 2010, http://googledrive.blogspot.in/2010/08/in-cell-dropdown-and-validation-in.html, 27 pages.

Kohlhase, et al., "FEncy: Spreadsheet Formulae Exploration", In Joint Proceedings of the MathUI, OpenMath and ThEdu Workshops and Work in Progress track at CICM co-located with Conferences on Intelligent Computer Mathematics, Jul. 7, 2014, 12 pages.

Singh, et al., "Transforming Spreadsheet Data Types using Examples", In Proceedings of Annual Symposium on Principles of Programming Languages, Oct. 26, 2015, 13 pages.

Trevi, Javier, "Showing all available MySQL data types when creating a new table with MySQL for Excel", Published on: Jul. 23, 2014, https://blogs.oracle.com/MySqlOnWindows/entry/showing_all_available_mysql_data, 8 pages.

Use Formula AutoComplete, Retrieved on: Oct. 26, 2015, https://support.office.com/en-us/article/Use-Formula-AutoComplete-6d13daa5-e003-4431-abab-9edef51fae6b, 4 pages.

Wallen, Jack, "Create graphs and complex math equations directly from the Google Docs sidebar with g(Math)", Published on: Jul. 22, 2015, 6 pages, available at: http://www.techrepublic.com/article/create-graphs-and-complex-math-equations-directly-from-the-google-docs-sidebar-with-gmath/.

Chang, et al., "A Spreadsheet Model for Using Web Service Data", In Proceedings of IEEE Symposium on Visual Languages and Human-Centric Computing, Jul. 28, 2014, pp. 169-176.

PCT International Preliminary Report on Patentability in PCT/US2017/016038, dated Aug. 7, 2018, 9 pages.

Bakke et al., "A spreadsheet-based user interface for managing plural relationships in structured data", Human Factors in Computing Systems, May 7, 2011, 10 pages.

Chang, et al., "A Spreadsheet Model for Handling Streaming Data", In Proceedings of the 33rd Annual ACM Conference on Human Factors in Computing Systems, Apr. 18, 2015, 4 pages.

PCT Invitation to Pay Additional Fees in PCT/US2016/060180, dated Feb. 9, 2017, 8 pages.

Brian C. Whitmer, "Brigham Young University Improving Spreadsheets for Complex Problems", All These and Dissertations, Paper 1713, Apr. 8, 2008, http://scholarsarchive.byu.edu/cgi/viewcontent.cgl?artcile=2712&context=etd, pp. 1-7, 15-26.

PCT International Search Report and Written Opinion in PCT/US2016/060180, dated Sep. 12, 2017, 22 pages.

Han et al., "Situational data integration with data services and nested table", Service Oriented Computing and Applications, vol. 7, No. 2, Apr. 27, 2012, pp. 129-150.

U.S. Appl. No. 15/340,187, Office Action dated May 18, 2018, 32 pages.

PCT International Preliminary Report on Patentability in PCT/US2016/060025, dated May 8, 2018, 16 pages.

PCT International Preliminary Report on Patentability in PCT/US2016/060180, dated May 8, 2015, 15 pages.

"Final Office Action Issued in U.S. Appl. No. 15/340,187", dated Jan. 2, 2019, 52 pages.

(56) References Cited

OTHER PUBLICATIONS

"Advisory Action Issued in U.S. Appl. No. 15/340,187", dated Mar. 26, 2019, 5 Pages.
"Non-Final Office Action Issued in U.S. Appl. No. 15/340,187", dated May 1, 2019, 60 Pages.
"Final Office Action Issued in U.S. Appl. No. 15/340,201", dated Jul. 11, 2019, 15 Pages.
"Notice of Allowance Issued in U.S. Appl. No. 15/340,187", dated Sep. 18, 2019, 9 Pages.
Non-Final Office Action Issued in U.S. Appl. No. 15/340,201, dated Jan. 2, 2019, 14 Pages.

* cited by examiner

PARAMETERIZING AND WORKING WITH MATH EQUATIONS IN A SPREADSHEET APPLICATION

CROSS-REFERENCE TO RELATED APPLICATIONS

The present application claims priority to U.S. Provisional Patent Application No. 62/289,771, filed Feb. 1, 2016 and entitled "Parameterizing and Working with Math Equations in a Spreadsheet Application." The present application is also related to U.S. Provisional Application Ser. No. 62/249,869, filed Nov. 2, 2015 and entitled "Rich Data Types;" U.S. Provisional Application Ser. No. 62/357,284, filed Jun. 30, 2016, and entitled "Rich Data Types;" and U.S. Non-Provisional application Ser. No. 15/340,187, filed Nov. 1, 2016 and entitled "Rich Data Types;" the disclosures of which are incorporated herein by reference in their entirety.

BACKGROUND

Spreadsheet applications facilitate data entry, however also require users to employ unique spreadsheet function notation in order to perform mathematical or logical operations on that data. Although spreadsheet applications are highly useful tools for gathering and organizing data, they are often underutilized as math applications that perform complex or even standard mathematical operations on such data due to the inability of such applications to fully evaluate equations and the unique challenges associated with data evaluation. In particular, spreadsheet applications are typically limited to performing simple evaluation on mathematical equations that can calculate to a single result. Spreadsheet applications are typically not used to evaluate complex equations, perform complex analysis on spreadsheet data, or recognize relationships among data. Furthermore, spreadsheet applications today are unable to receive and translate equations in standard math notation, but instead require equations to be input in spreadsheet notation, which is oftentimes complex. It is with respect to these and other general considerations that aspects of the present disclosure have been made. Additionally, although relatively specific problems are discussed, it should be understood that the aspects should not be limited to solving only the specific problems identified in the background

SUMMARY

In a first aspect, the present disclosure is directed to a computer-implemented method for connecting one or more variables of a math equation stored in a cell of a spreadsheet with data stored in other cells of the spreadsheet, the method comprising: receiving the math equation, wherein the math equation includes a variable; for the variable, receiving a reference to a second cell as an input parameter; and substituting the variable with data stored in the second cell.

In a second aspect, the present disclosure is directed to a system comprising: at least one processing unit; and at least one memory storing computer executable instructions that, when executed by the at least one processing unit, cause the system to perform a method for displaying dependencies among cells of a spreadsheet, the method comprising: receiving the math equation at a first cell of the spreadsheet, wherein the math equation includes a variable; for the variable, receiving a reference to a second cell as an input parameter, wherein the second cell stores data; and displaying a dependency from the first cell to the second cell.

In a third aspect, the present disclosure is directed to a system comprising: at least one processing unit; and at least one memory storing computer executable instructions that, when executed by the at least one processing unit, cause the system to perform a method for translating equations written in mathematical notation to spreadsheet notation, the method comprising: receiving an equation at a cell of the spreadsheet, the equation comprising two or more elements; identifying each element of the equation determining whether at least one element of the equation is written in mathematical notation based on a determination that at least one element of the equation is written in mathematical notation, translating each of the at least one element into spreadsheet notation; and replacing each of the at least one element written in mathematical notation with the translated spreadsheet notation.

In a fourth aspect, the present disclosure is directed to a computer-implemented method for receiving an equation in a math display mode of a spreadsheet application, the method comprising: receiving, at an equation user interface, a math equation; parsing the math equation; and displaying the math equation in a cell of a spreadsheet.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 11A illustrates a mathematical equation provided in a cell of the spreadsheet.

FIG. 11B, illustrates an exemplary spreadsheet application capable of evaluating the mathematical equation illustrated in FIG. 11A.

FIG. 12A illustrates an evaluation user experience of the disclosed spreadsheet application.

FIG. 13C illustrates an example in which dependencies are displayed in the formula bar.

FIG. 14A and FIG. 14B provide the display of dependent relationships among multiple variables stored in multiple cells.

DETAILED DESCRIPTION

Figure 1:
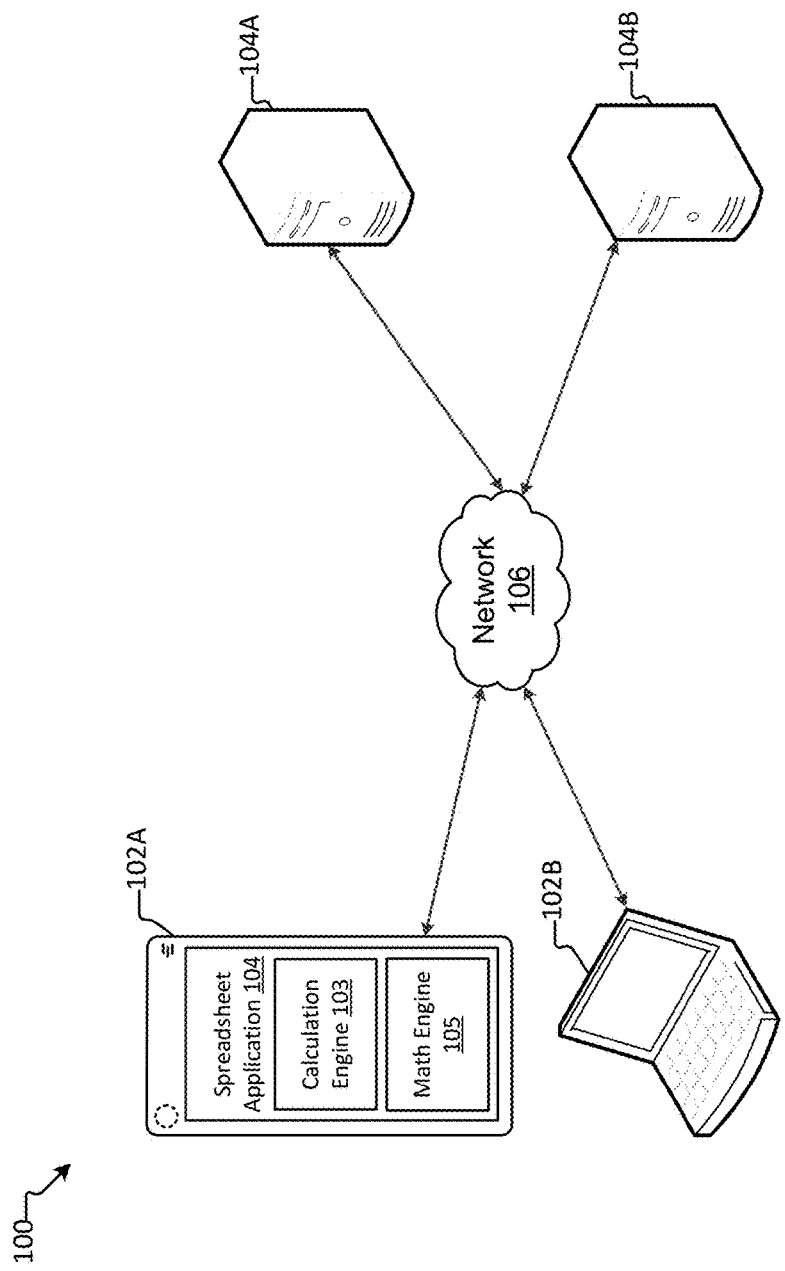
FIG. 1 illustrates a system for executing a spreadsheet application including a calculation engine and a math engine, according to an example embodiment.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Generally, the present disclosure is directed to a spreadsheet application with enhanced mathematical evaluation and computational capabilities. These advanced capabilities include, but are not limited to, evaluation of both simple and complex equations, simplification of expressions, and manifestation of steps for simplification and evaluation of expressions. Aspects further describe a spreadsheet application that can easily convert equations or values rendered in ink and print. Aspects further disclose a spreadsheet application that can convert between equations written in standard math notation and spreadsheet notation, and can also recognize and perform calculations on mixed equations including both spreadsheet notation and math notation. Aspects further describe a spreadsheet application that can associate variables in equations to data stored in other cells, allowing the ability to drive equations from data stored in other cells of the spreadsheet application. Aspects further describe a spreadsheet application that can show dependencies of variables as they relate to other variables or values within the spreadsheet, allowing a user to more readily understand and visually see how complex equations may be driven by other data. Aspects further describe an intelligent spreadsheet application that can analyze data stored in the spreadsheet and provide recommendations regarding how to display data. Aspects also disclose a spreadsheet application that can provide a display mode in which equations can quickly and easily be input into the spreadsheet and analyzed. These and other aspects are described in further detail herein.

FIG. 1 illustrates a system 100 for executing a spreadsheet application including a calculation engine 103 and a math engine 105, according to an example embodiment.

As illustrated, system 100 may include one or more client computing devices 102 (e.g., client computing devices 102A and 102B) that may execute a client version of a spreadsheet application 104 including a math engine 103 and a calculation engine 105. In some examples, the client spreadsheet application 104 may execute locally on a client computing device 102. In other examples, a client spreadsheet application 104 (e.g., a mobile app on a thin client computing device 102) may operate with a corresponding server version of spreadsheet application executing on one or more server computing devices. In such embodiments, the client computing device 102 may communicate with the corresponding server version of the spreadsheet application over a network (e.g., network 106). In still other aspects, rather than executing a client version of a spreadsheet application, the one or more client computing devices 102 may remotely access, e.g., via a browser over a network (e.g., network 106), the spreadsheet application implemented on a server computing device or multiple server computing devices (e.g., in a distributed computing environment such as a cloud computing environment).

Typical spreadsheet applications use a calculation engine 103 to parse and analyze the data stored in each cell of a spreadsheet. As referred to herein, data includes, but is not limited to: equations, values, string text, date/time, currency, Boolean values, etc. The calculation engine 103 identifies the type of data stored in each cell and performs simple calculations on data. The calculation engine 103 can also evaluate expressions written in spreadsheet notation (e.g., expressions including a cell reference or having a spreadsheet operator such as "SUM," "IF," "MAX," etc.). For example, the calculation engine 103 may be used to evaluate an expression written in spreadsheet notation (e.g., "=SUM (A1, B1)") by determining the values corresponding to the referenced cells and evaluating the expression. The calculation engine, therefore, simplifies expressions written in spreadsheet notation in order to calculate such expressions to a final result. Accordingly, the calculation engine does not only solve mathematical equations (e.g., solving the equation "=SUM(2+3)"), but rather, is also used to compute results by identifying values stored in various cells based on an understanding of spreadsheet notation.

Novel aspects of the present disclosure provide a spreadsheet application 104 that includes, in addition to a calculation engine 103, a math engine 105 that can solve and simplify complex mathematical equations. In particular, the math engine 105 can, among other features, recognize characters of an equation written in mathematical notation (e.g., normal math notation using operators such as "$\sqrt{}$" "÷" "$\int$" "+"), combine elements to generate mathematical expressions, simplify expressions, and understand and apply orders of operation to solve equations, resulting in a data value or another mathematical expression. The math engine may be provided as part of the spreadsheet application 104 or it may be provided as a supported component of the spreadsheet application 104. The math engine provides the spreadsheet application 104 with the ability to evaluate complex math equations. The use of a math engine in a spreadsheet application further allows users to quickly export and import equations to and from other math applications external to the spreadsheet application. Accordingly, the spreadsheet application can be used more than for simple data entry, but can be used as a more powerful tool that is capable of providing advanced mathematical computation analysis and that is compatible with other mathematical applications. Further embodiments describe outputting equations as strings as well as in other math compatible formats (e.g., MathML).

Aspects of the present disclosure are therefore directed to a spreadsheet application 104 that uses a calculation engine 103 in conjunction with a math engine 105 to evaluate the data stored in each cell of the spreadsheet. Cells of a spreadsheet may contain data comprising a spreadsheet reference (e.g., a reference to another cell, text, a data value), data comprising a math reference (e.g., an equation), or data comprising both a spreadsheet reference and a math reference (e.g., an equation including a reference to another cell). Accordingly, the disclosed spreadsheet application 104, using the calculation engine 103 and the math engine 105, is capable of evaluating complex mathematical equations and is further capable of evaluating complex mathematical equations that also use spreadsheet references. Thus, the disclosed spreadsheet application 104 is capable of storing data and performing complex computations on that data, enabling users to more readily understand data, analyze data, and perform complex mathematical computations on data stored in a spreadsheet.

In some embodiments, the calculation engine 103 and the math engine 105 are implemented as the same component and in other embodiments they are implemented as separate components. In some embodiments, the calculation engine 103 performs processes on an equation first while the math engine 105 performs processes second. Alternatively or additionally, the math engine 105 performs processes first and the calculation engine 103 performs processes second. Alternatively or additionally, the math engine 103 and the calculation engine 105 perform processes simultaneously.

In a basic configuration, the one or more client computing devices 102 are personal or handheld computers having both input elements and output elements operated by one or more users. For example, the one or more client computing devices 102 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. Any suitable client computing device for executing a client spreadsheet application and/or remotely accessing spreadsheet application may be utilized.

In some aspects, network 106 is a computer network such as an enterprise intranet and/or the Internet. In this regard, the network 106 may include a Local Area Network (LAN), a Wide Area Network (WAN), the Internet, wireless and wired transmission mediums. In further aspects, server computing devices as described herein may communicate with some components of the system via a local network (e.g., an enterprise intranet), whereas such server computing devices may communicate with other components of the system via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

The spreadsheet application may be implemented on a server computing device (e.g., server computing device 104A and 104B). In a basic configuration, server computing device 104 may include at least a processing unit and a system memory for executing computer-readable instructions. In some aspects, server computing device 104 may comprise one or more server computing devices 104 in a distributed environment (e.g., cloud computing environment). Server computing device 104 may provide data, associated with cells of a spreadsheet to and from the one or more client computing devices 104 and/or one or more other server computing devices via network 106.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Concept 1: Convert Equations to any Format

Figure 2:
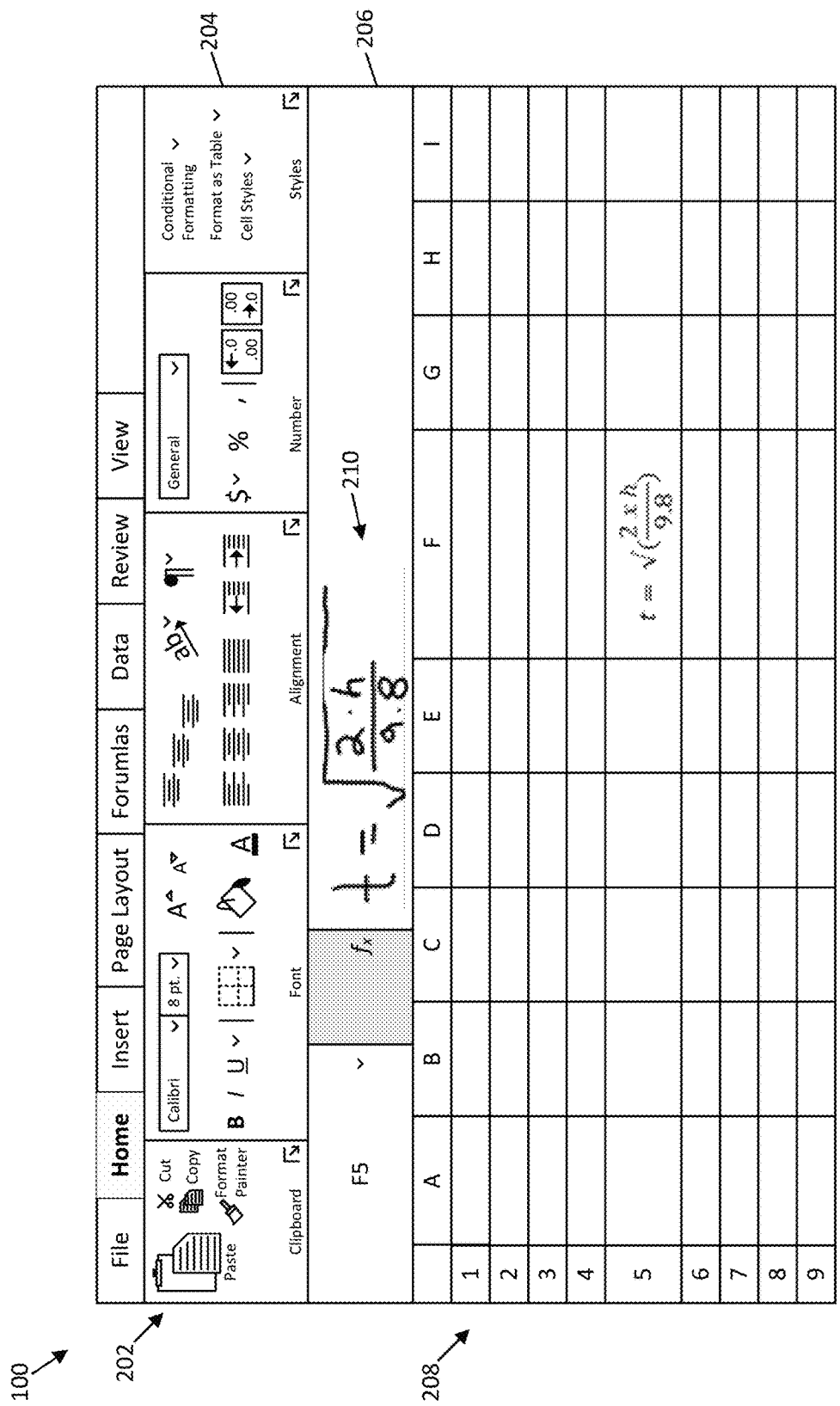
FIG. 2 illustrates an example user interface of a spreadsheet application that is capable of converting an equation into various formats.

FIG. 2 illustrates an example user interface 202 of a spreadsheet application that is capable of converting an equation into various formats. The example user interface 202 includes a ribbon user interface 204 including a set of toolbars, each of which implement a particular functionality, such as, for example, font, alignment, style, page formatting, insertion of charts and tables, review/editing, etc. The user interface 202 further includes a formula bar 206 that is an editable area in which equations, text, or other data may be input for entry into the spreadsheet. The user interface 202 further includes a cell grid 208 comprising a plurality of individual cells that store data.

The disclosed spreadsheet application, such as spreadsheet application 104, can receive an equation in a variety of different formats and is capable of converting that format into a text format. For example, the spreadsheet application 104 may receive an equation or other input in the form of electronic ink, a photograph, or a spoken utterance and is capable of converting that input into a text format. In the example illustrated in FIG. 2, a mathematical formula 210 is provided in electronic ink and is displayed in a formula bar 206. The mathematical formula 210 may be received by the spreadsheet application from an ink-enabled device, such as, for example, a mobile phone, a tablet computing device, or an ink-enabled laptop computer. Using such a device, the user may simply, by hand or using a stylus, write the mathematical equation 210 directly to the formula bar 210, to a cell, to a text-entry display mode, or via an application that can transfer the inked mathematical formula 210 to the spreadsheet application 104. The math engine, such as math engine 105, is capable of converting the received inked equation into a text format using, for example, ink to text conversion techniques. The spreadsheet application is capable of converting an equation received as an image into a text format using, for example, optical character recognition (OCR) techniques. The spreadsheet application is capable of converting the received spoken equation into a text format using, for example, natural language understanding techniques. Accordingly, aspects provide a spreadsheet application that is capable of converting a received equation into a text format, thereby providing users with the ability to easily enter complex equations into the spreadsheet.

Concept 2: Conversion b/w Math and Spreadsheet Notation

Figure 3:
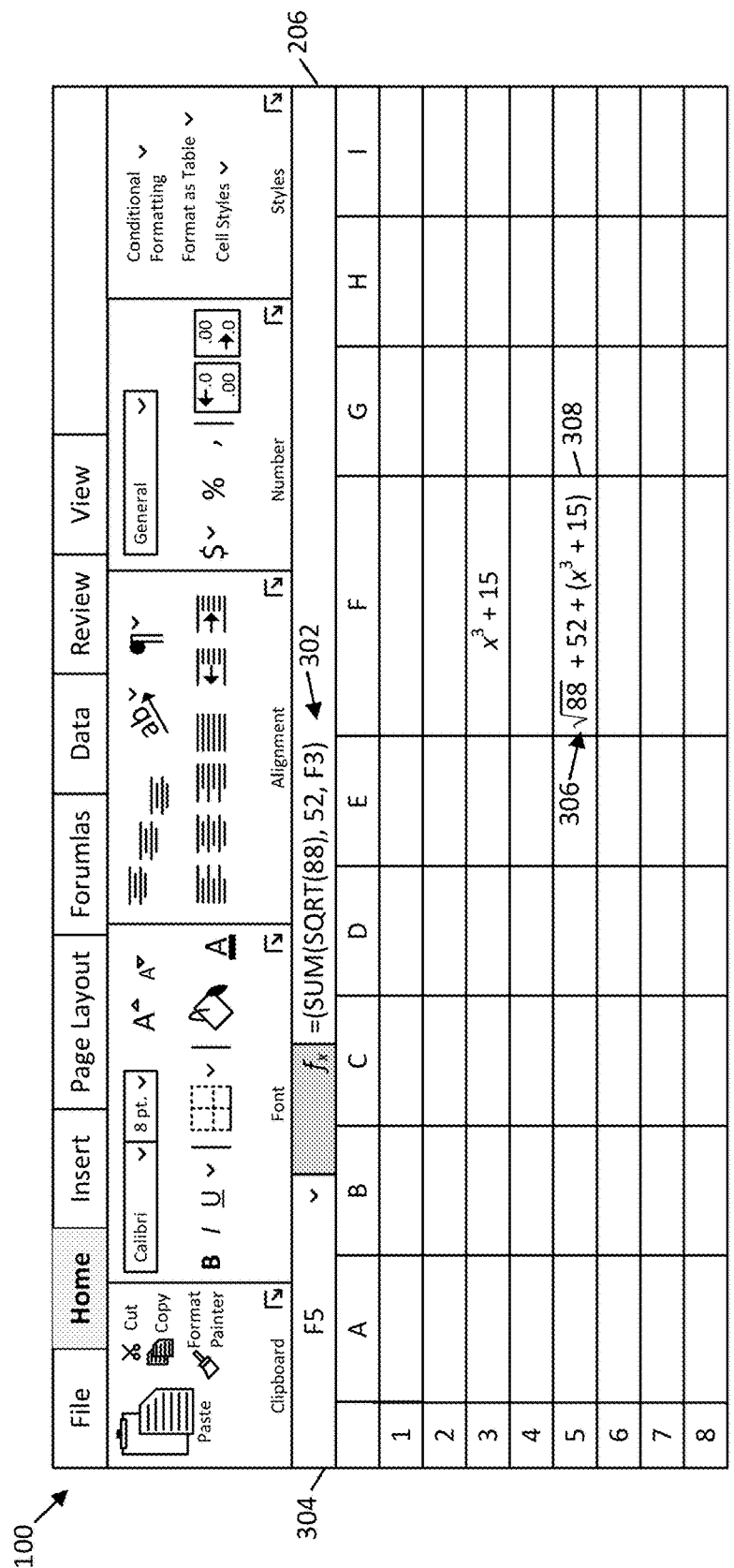
FIG. 3 illustrates an exemplary spreadsheet application that is capable of converting an equation written in spreadsheet notation to mathematical notation.

FIG. 3 illustrates an exemplary spreadsheet application 104 that is capable of converting an equation written in spreadsheet notation to mathematical notation. Spreadsheet applications typically use a unique notation referred to as spreadsheet notation to represent mathematical equations and to reference cells. Spreadsheet notation is typically complex and oftentimes difficult to understand and learn because it is not similar to, nor ordered like the commonly understood mathematical notation. Furthermore, spreadsheet notation does not use symbol operators such as, for example, the integral sign, symbols for series or sums, the square root sign, etc. In an example, spreadsheet notation may represent an equation such as the sum of the square root of 88, 52, and 7 as "=SUM(SQRT(88), 52, 7)." By contrast, mathematical notation is the standard written notation used to draft equations using symbols operators to connect elements of the equation. In a similar example, the sum of the square root of 88, 52, and 7 in mathematical notation would be written as "$\sqrt{88}+52+7$."

Referring back to FIG. 3, illustrated is a spreadsheet application 104 having an equation 302 provided in the formula bar 206. Equation 302, is written in spreadsheet notation and is represented as "=SUM(SQRT(88), 52, F3)" includes four elements: the square root of 88, the number 52, and a reference to cell F3 (wherein cell F3 stores the equation "$x^3+15$"). Furthermore, the SUM function indicates that each element of the equation 302 is added together. It is noted based on the cell reference 304, the equation (or corresponding result) is to be stored in cell F5. Aspects of the present disclosure provide a spreadsheet application 104 that is capable of converting the equation 302 written in spreadsheet notation to one written in mathematical notation. Accordingly, the corresponding equation 306 (i.e., "$\sqrt{88}+52+(x^3+15)$") stored in cell F5 308 is provided in mathematical notation. The equation 306, written in mathematical notation, corresponds to equation 302 written in spreadsheet notation and therefore also represents the sum of the three elements: the square root of 88, the number 52, and cell reference F3. Although in this example, the cell reference F3 is replaced with the math equation "$x^3+15$" stored in that particular cell, in other examples, the equation 306 may maintain the cell reference F3.

In this example, the calculation engine 103 of the spreadsheet application 104 parses the equation 302 written in spreadsheet notation to identify each of the elements contained therein. The calculation engine 103 also identifies any logical operations written in spreadsheet notation that are performed on those elements. Thus, in this example, the calculation engine 103 identifies the "SUM" function as an addition of the three elements. The calculation engine 103 also obtains the data stored in cell F3. Based on the parsing performed on the equation 302 and the data obtained from cell F3, the calculation engine 103 provides the detailed structure of the equation 302, including the data stored in cell F3 to the math engine 105, which constructs the equation 306 in mathematical notation. In particular, the math engine 105 obtains detailed information about the equation 302, such as, for example, the logical operators performed on the equation, any data obtained from cell references, and constructs the equivalent equation 306 in mathematical notation. Accordingly, the resultant equation 306 stored in cell F5 308 is displayed in the equivalent mathematical notation including the substituted argument for the cell reference F3.

Accordingly, aspects of the present disclosure provide a spreadsheet application 104 that is capable of converting and displaying an equation originally written in spreadsheet notation to the mathematical notation equivalent. Aspects also provide a spreadsheet application capable of substituting cell references within equation arguments for the actual data stored therein.

It is understood that the equation 302 may be provided in the formula bar 206 or directly into a cell of the spreadsheet. Based on a user's operation of the enter key, or a similar operation resulting in a final entry of the equation into the formula bar 206 or a cell, the spreadsheet application 104 can automatically provide the resultant equation 306 written in mathematical notation. In other embodiments, the spreadsheet application 104 may display a prompt providing an option for the user to display the equation 306 in mathematical notation. Still, in other embodiments, the spreadsheet application 104 may display a prompt asking whether the user would like the spreadsheet application 104 to evaluate the equation to a final result or perform other operations on that equation 302, such as, for example, generating a chart or graph. Such functionality is described in further detail herein.

Figure 4:
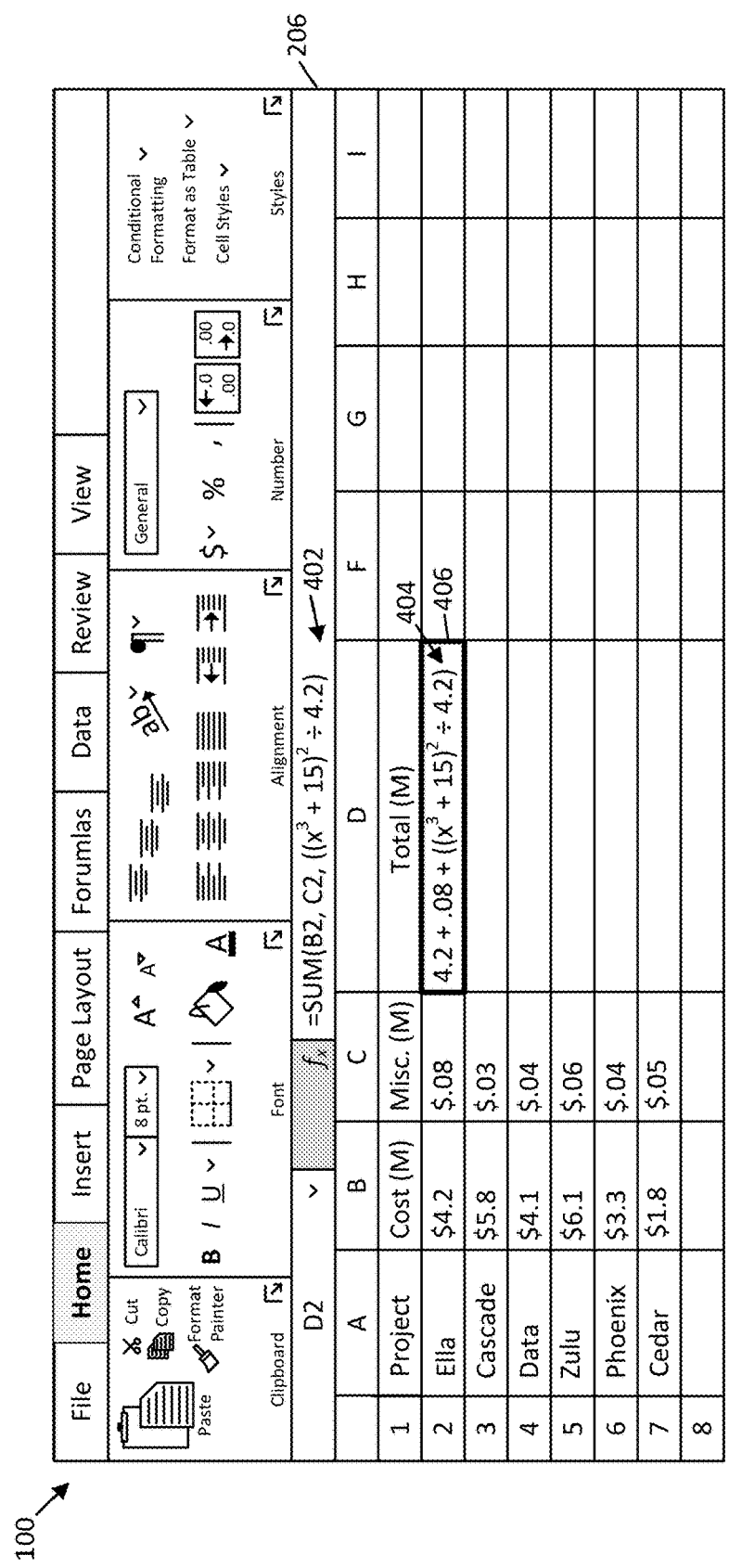
FIG. 4 illustrates an exemplary spreadsheet application that is capable of converting an equation written in mixed spreadsheet and mathematical notation to mathematical notation.

FIG. 4 illustrates an exemplary spreadsheet application 104 that is capable of converting an equation written in mixed spreadsheet and mathematical notation to mathematical notation. Spreadsheet notation may be complex and challenging to learn, and particularly with respect to complex equations. Accordingly, novel aspects of the present disclosure include a spreadsheet application 104 that is capable of evaluating expressions written in spreadsheet notation, mathematical notation, or a combination thereof. In an example, the spreadsheet application 104 can evaluate an equation having one or more parts written in mathematical notation and one or more parts written in spreadsheet notation. For example, as illustrated in FIG. 4, the equation 402 represented as "=SUM(B2, C2, $((x^3+15)^2 \div 4.2)$)" is provided in the formula bar 206. The equation 402 includes three elements: cell reference B2, cell reference C2, and argument "$(x^3+15)^2 \div 4.2$." The cell references B2 and C2 are written in spreadsheet notation and the argument "$(x^3+15)^2 \div 4.2$" is written in mathematical notation. Furthermore, the cell references and the argument are nested inside the "SUM" spreadsheet notation operator. Accordingly, the equation 402 is written in both spreadsheet notation and mathematical notation.

In this example, the calculation engine 103 of the spreadsheet application 104 parses the equation 402 written in both spreadsheet notation and mathematical notation to identify each element contained therein. The calculation engine 103 also identifies any logical operations written in spreadsheet notation that are performed on those elements. Thus, in this example, the calculation engine 103 identifies the "SUM" function as an addition of the three elements. The calculation engine 103 also obtains the data stored in cells B2 and C2 (i.e., $4.2 and $0.08, respectively). Based on the parsing performed on the equation 302 and the data obtained from cells B2 and C2, the calculation engine 103 provides the detailed structure of the equation 402, including the data stored in cells B2 and C2 to the math engine 105. In response, the math engine 105 converts the equation 402 to mathematical notation based on the data provided to it by the calculation engine 103 and outputs equation 404, which is stored in cell D2 406. Based on the information it receives from the calculation engine 103, the math engine 105 inserts addition operators between each identified element to output equation 404 written in mathematical notation (i.e., "4.2+

$0.08+((x^3+15)^2 \div 4.2)$"). Although this example illustrates the addition of three elements of an equation, aspects of the present disclosure are directed to the insertion of other operators in more complex equations. Accordingly, the disclosed spreadsheet application 104 is capable of converting equations written in spreadsheet notation to mathematical notation using the calculation engine 103 in conjunction with the mathematical engine 105.

In some embodiments, the math engine 105 may simplify the equation 402 in the cell rendering (e.g., in cell D2 406). For example, the math engine 105 might add the value "4.2" stored in cell B2 and value "0.08" stored in cell C2 to arrive at the value "5.0" in the cell rendering of cell D2 406. Alternatively or additionally, the spreadsheet application 104 may visually display the referenced cells (e.g., cells B2 and C2) differently from other non-referenced cells so that the user may see the cells in which the values are stored. For example, the referenced cells may be highlighted or the cell border color may be different, etc.

It is understood that the equation 402 may be provided in the formula bar 206 or directly into cell D2 406 of the spreadsheet. Based on a user's operation of the enter key, or a similar operation resulting in a final entry of the equation 402 into the formula bar 206 or a cell, the spreadsheet application 104 can automatically provide the evaluated final result 404 in cell D2 406. Yet, in other embodiments, the spreadsheet application 104 may display a prompt providing an option for the user to display the final result 404 in cell D2 406 or display, in cell D2 406, the equation 402 written in mathematical notation without evaluating the equation 402. In embodiments, if the option to display the final result 404 is selected, the original equation may still be maintained and referenced. For example, a separate user interface displaying the original equation may be provided in response to hovering over the cell displaying the final result 404. Such a user interface may also allow the equation to be selectable and editable. Yet in other embodiments, other user interfaces may also be provided.

Although this example illustrates an argument written in mathematical notation is nested within a function written in spreadsheet notation, such nesting is not required. For example, an equation, such as "=(SUM(B2, C2))+32)" may also be evaluated by the spreadsheet application 104. In such an example, the arguments of the equation are written in both spreadsheet notation and mathematical notation and are not nested. Thus, aspects of the present disclosure provide a spreadsheet application 104 that is capable of evaluating an equation having mixed spreadsheet notation and mathematical notation.

Figure 5:
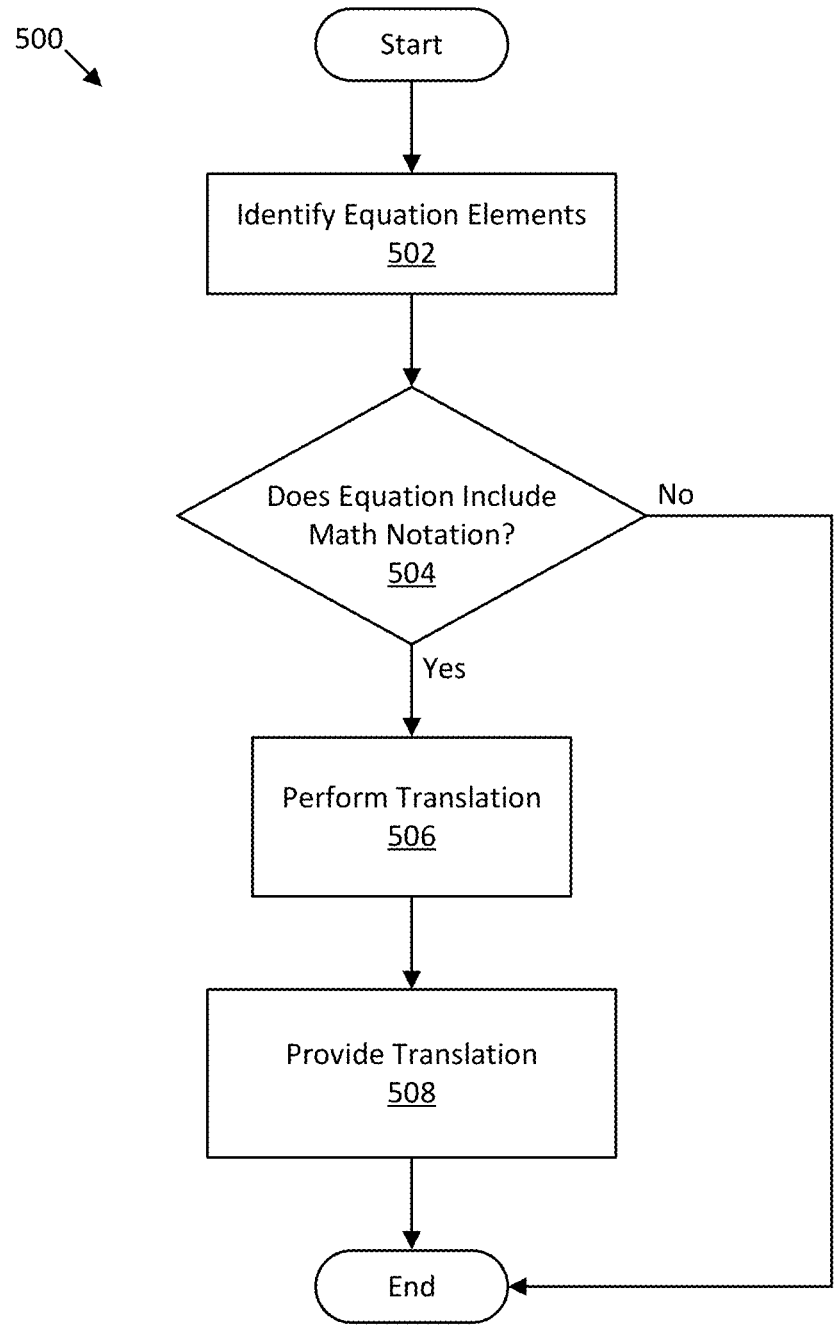
FIG. 5 illustrates a flow chart of a method for converting an equation written in spreadsheet notation to math notation as performed by the calculation engine.

FIG. 5 illustrates a flow chart of a method 500 for converting an equation written in spreadsheet notation to math notation as performed by the calculation engine 103. In operation 502, the calculation engine 103 identifies and parses the elements of the equation. In particular, the calculation engine 103 identifies each element of the equation and determines which element, if any, is written in spreadsheet notation. For example, the calculation engine can identify each individual element of the equation "=PRODUCT(A4, 2)" In such an example, the calculation engine 103 will identify two elements: the cell reference A4 and the value 2. The calculation engine 103 will also identify the "PRODUCT" function in operation 502.

In operation 504, the calculation engine 103 determines whether the equation includes mathematical notation. Based on the analysis performed in operation 502, the calculation engine can determine whether the equation is written in spreadsheet notation, mathematical notation, or a combination of spreadsheet notation and mathematical notation. If, based on an analysis of the equation elements in operation 502, the calculation engine 103 determines that the equation is written in only mathematical notation (e.g., NO at operation 504), the method 500 ends. If, alternatively, based on an analysis of the equation elements in operation 502, the calculation engine 103 determines that the equation is written in spreadsheet notation or a combination of spreadsheet notation and mathematical notation (e.g., YES at operation 504), the method 500 proceeds to operation 506.

In operation 506, the calculation engine 103 performs a translation of the identified one or more elements written in spreadsheet notation. For example, the calculation engine 103 may translate the parts of the equation "=PRODUCT (A4, 2)" written in spreadsheet notation. In particular, the calculation engine 103 may obtain the data stored in cell A4, which might be, for example a number or another equation. If the data stored in cell A4 is a number, the calculation engine 103 obtains that number. If, alternatively, the data stored in cell A4 is another equation including, for example, another cell reference (e.g., "B4" or "SUM(B4, 5)"), the calculation engine 103 further retrieves the data stored in that referenced cell. Accordingly, the calculation engine 103 iteratively retrieves data until all such data is retrieved.

In operation 508, the calculation engine 103 provides the translated values and function information to the math engine 105. In particular, the calculation engine 103 provides, to the math engine 105, each retrieved value while also providing the order of operation information of those retrieved values as well as the function operations performed on the retrieved data. The conversion performed by the math engine 105 is described in further detail with reference to FIG. 6.

Figure 6:
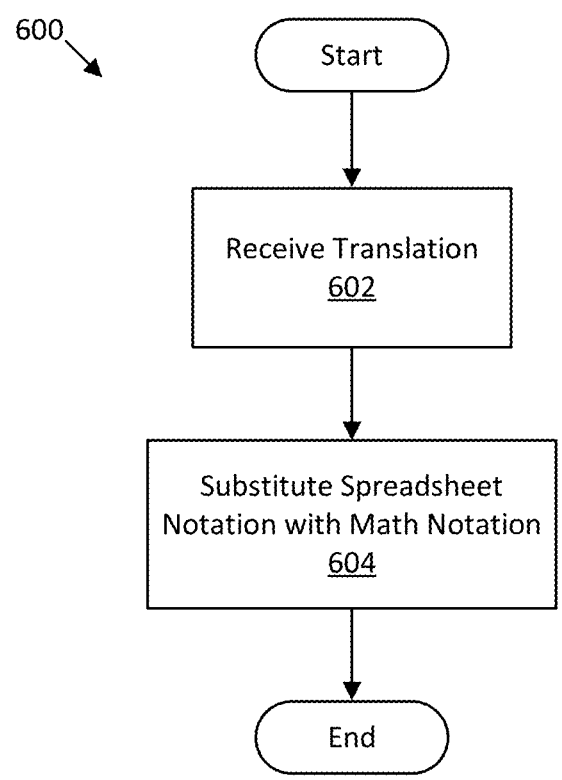
FIG. 6 illustrates a flow chart of a method for converting an equation written in spreadsheet notation to math notation as performed by the math engine.

FIG. 6 illustrates a flow chart of a method 600 for converting an equation written in spreadsheet notation to math notation as performed by the math engine 105. In operation 602, the math engine 105 receives, from the calculation engine 103: elements of the equation to be converted/translated, data that is stored in the cells that are referenced by the equation, and one or more function operators.

In operation 604, the math engine 105 substitutes spreadsheet notation with math notation. In particular, the math engine 105 constructs the equivalent equation in mathematical notation by substituting values as provided by the calculation engine based on an order of operations and the one or more function operators provided by the calculation engine 103. Accordingly, the disclosed spreadsheet application is capable of converting an equation written in spreadsheet notation to one written in mathematical notation.

Figure 7:
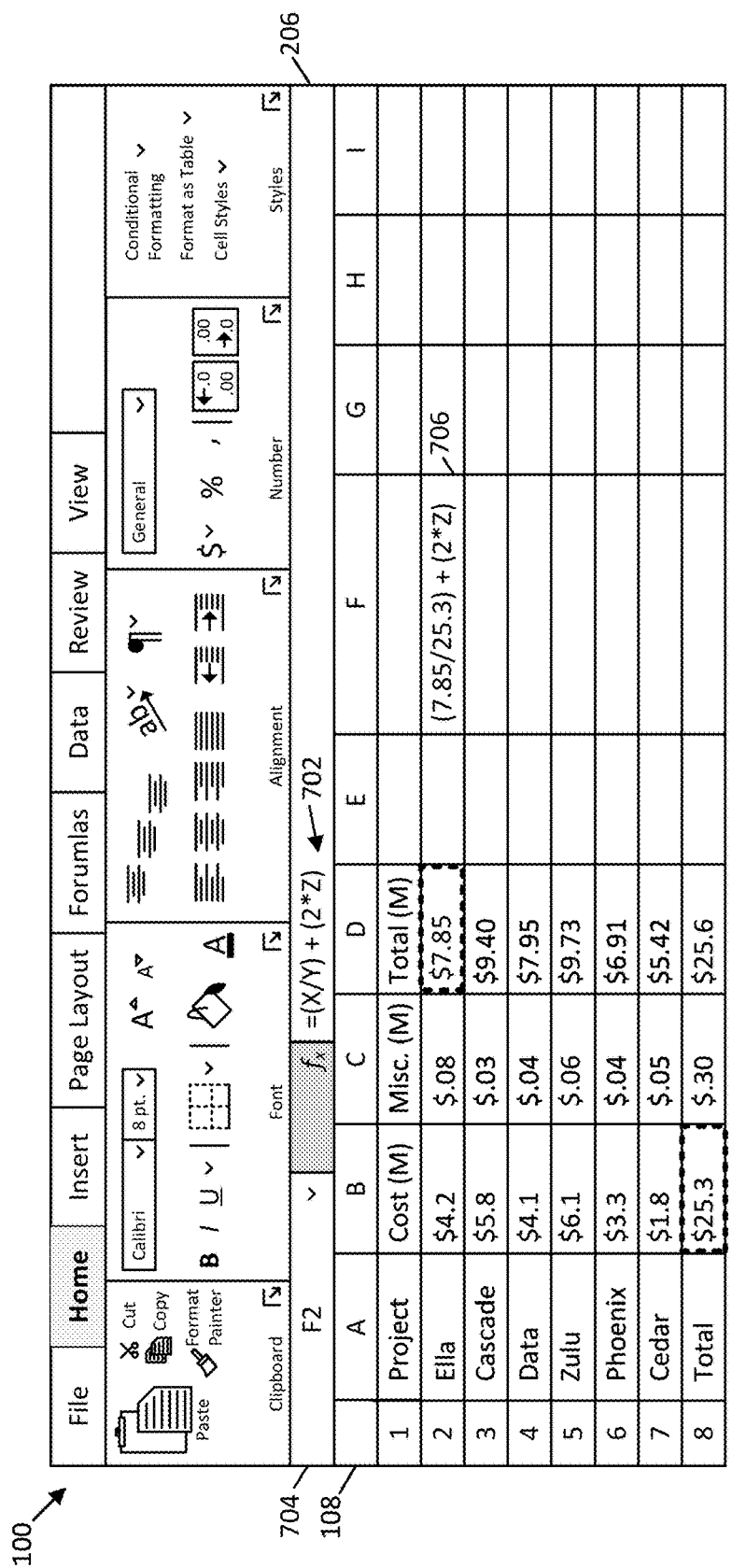
FIG. 7 illustrates a spreadsheet application providing the ability to associate variables of a math equation to data stored in the spreadsheet.

Concept 3: Connecting Variables of Math Equations to Values Stored in Other Cell as Parameters FIG. 7 illustrates a spreadsheet application providing the ability to associate variables of a math equation to data stored in the spreadsheet. In particular, a user may, for each variable of a math equation, select one or more cells as parameters. Accordingly, math equations can be driven by data stored in other cells. The present disclosure is further directed to providing a user interface that allows a user to specify a cell or cells as parameters to a variable of an equation. For example, a user interface may be provided that allows a user to specify one or more cells as parameters to each variable of an equation. The spreadsheet application 104 may substitute those specified values in the equation itself.

Referring back to FIG. 7, an equation 702 is represented as "(X/Y)+(2*Z)" in the formula bar 206. As indicated by the cell identifier 704, that equation 702 is stored in cell F2. In this example, the variable "X" is associated with the data stored in cell D2 (i.e., "$7.85"), and variable "Y" is associated with the data stored in cell B8 (i.e., "$25.3"). In this example, the cells D2 and B8 are displayed with a dashed border, indicating they are referenced cells. In other embodiments, other indicators may be used to show that a particular cells is referenced by the selected equation. Associating variables to one or more cells in the spreadsheet can be done, for example, by selecting the particular variable in the formula bar and selecting a corresponding cell, cells, or range of cells to associate with that selected variable. In other embodiments, a separate user interface may be presented to allow the user to select one or more cells to use as parameters of a particular variable. Referring back to FIG. 7, based on the user's association of variables to cells, the equation 702 stored in cell F2 is rendered as an equation including the current value of each variable. Thus, in this example, the equation stored in cell F2 is represented as "(7.85/25.3)+(2*Z)." Although this example illustrates a single cell is used as a parameter to each variable, it is understood that more than one cell may be used as input parameters. In such an example, if more than one cell is used as a parameter to a variable, the output may include, for example, a rendering of the equation for each parameter. It is therefore understood that the spreadsheet application 104 can return a rendering, or multiple renderings, of the equation representing a substituted result of the variables based on the user's selection of a cell or cells corresponding to those variables.

Furthermore, in some embodiments, the spreadsheet application 104 may automatically, or in response to user input, simplify the expression. So in the example provided in FIG. 7, the spreadsheet application 104 might simplify the equation to "0.31+(2*Z)." In other embodiments, the math engine may first simplify the expression prior to substituting the variables within the equation, thereby returning a simplified, substituted result. For example, an equation represented as "$(x^2 \div x)+2z$," may be first simplified to the expression "x+2z" prior to substituting the variables with the cell value. The spreadsheet application 104 may also display each of the simplification steps, and it may do so using the variables of the equation or using the substituted variables.

Figure 8:
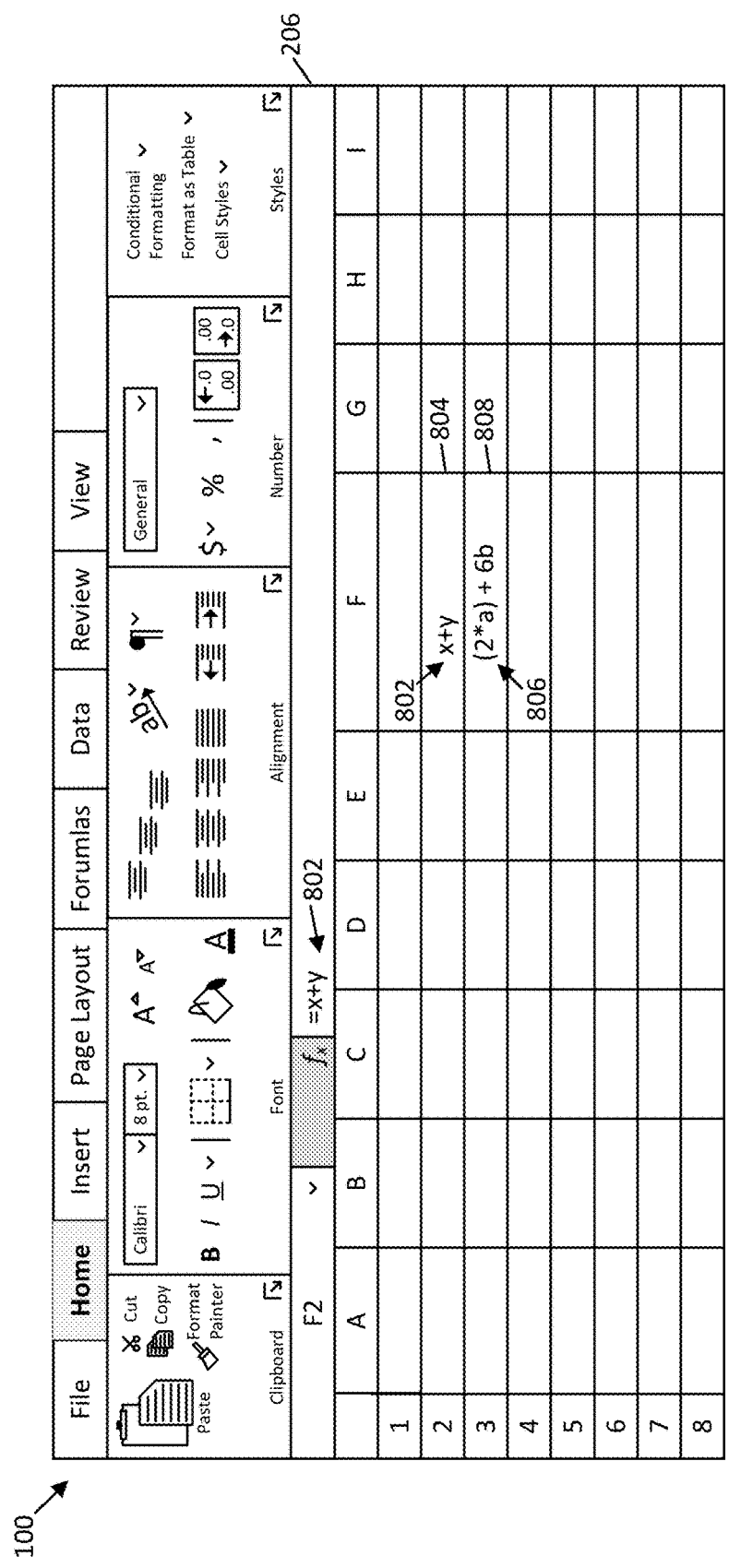
FIG. 8 illustrate a spreadsheet application capable of specifying, as inputs to variables of a math equation, data stored in one or more cells.
Figure 9:
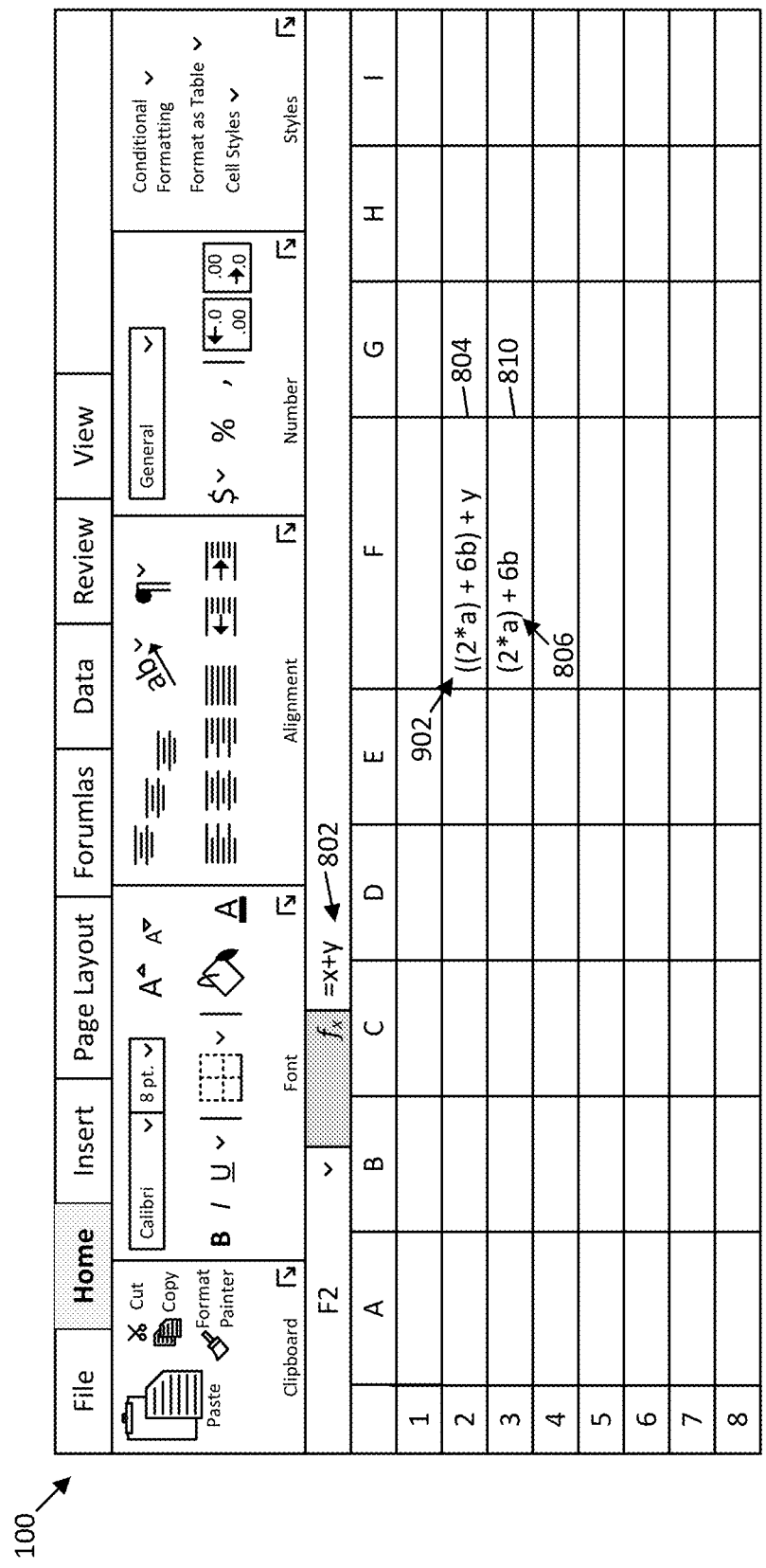
FIG. 9 illustrates the equation comprising the substituted result of the example equation illustrated in FIG. 8.

FIG. 8 and FIG. 9 further illustrate a spreadsheet application capable of specifying, as inputs to variables of a math equation, data stored in one or more cells. In some examples, the data stored in the one or more cells may include yet another equation containing one or more additional variables. Accordingly, the disclosed spreadsheet application 104 provides the ability to drive a math equation with data stored in one or more other cells. FIG. 8 illustrates a first equation 802 stored in cell F2 804 and a second equation 806 stored in cell F3 808. As shown, the first equation 802 includes variables "x" and "y" while the second equation 806 includes variables "a" and "b." In this example, the second equation 806 stored in cell F3 808 may be specified as an input to variable "x" of the first equation 802. As described herein, a user may specify cells as inputs to variables by selecting the variable in the equation and selecting a corresponding cell, cells, or range of cells to associate with that selected variable. In other embodiments, a separate user interface may be presented to the user to select the cell or cells associated with a particular variable.

FIG. 9 illustrates the equation comprising the substituted result of the example equation illustrated in FIG. 8. In particular, FIG. 9 illustrates new equation 902, which comprises the second equation 806 substituted for variable "x" of the first equation 802 of FIG. 8. Accordingly, equation 902 is driven by the data stored in cell F3 810. In some embodiments, the data stored in the cell that is specified as an input to a variable may itself include a reference to another cell, and that cell may contain a reference to another cell. Accordingly, the disclosed spreadsheet application 104 iteratively obtains the data stored in each referenced cell in order to obtain a final, substituted result. In particular, the calculation engine 103 performs the iterative process to obtain the data stored in each referenced cell in order to obtain the complete substituted result. In an example, cell A1 may be specified as an input for the variable "x" of the example equation "x+2z." Cell A1 may contain the equation "B4+3y," and cell B4 may contain the value 7. In such an example, the calculation engine 103 may first obtain and substitute the value of cell A1 (e.g., "B4+3y") for the variable "x" to obtain the first substituted equation of "B4+3y+2z." Next, the calculation engine 103 may obtain and substitute the value of cell B4 (e.g., "7") for cell reference B4 to obtain a final substituted equation of "7+3y+2z."

In embodiments, if the data stored in a cell that is specified as an input to a variable is edited, the equation would also update accordingly. In embodiments, this update would occur automatically and in other embodiments, this update would occur in response to a user selection to update the equation.

It is further understood that the math engine of the spreadsheet application 104 may first simplify the expression prior to substituting the one or more variables of an equation with another equation, thereby returning a simplified, substituted result. The spreadsheet application 104 may also display each of the simplification steps. Accordingly, aspects of the present disclosure provide a spreadsheet application that can drive math from data stored in other cells, whether that data is a number, numbers, or an equation containing one or more variables.

Figure 10:
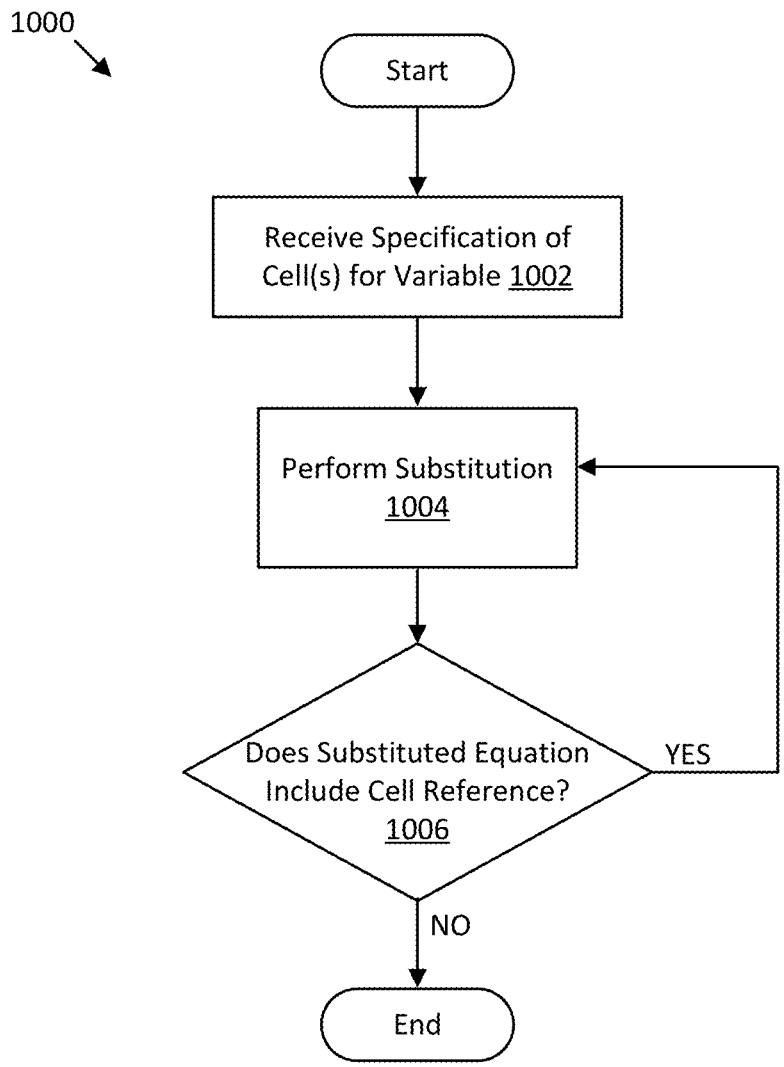
FIG. 10 illustrates a flow chart of a method for substituting a cell for a variable of an equation.

FIG. 10 illustrates a flow chart of a method 1040 for substituting a cell for a variable of an equation. In some embodiments, this method 1040 is performed by the calculation engine 103. The method 1040 begins at the start operation then proceeds to operation 1042 in which the spreadsheet application receives a cell or a portion of a cell as an input parameter for a variable. In particular, the user specifies one or more cells or portions of cells (e.g., a variable of an equation or part of an equation) as an input parameter for a variable. In example embodiments, a user may select the variable in the equation and select a corresponding cell, portion of a cell, cells, or range of cells to associate with that selected variable. In other embodiments, a separate user interface may be presented to the user to select the cell or range of cells associated with a particular variable. In an example, the user may specify the cell A1, and therefore the corresponding data included therein, as an input for the variable "x" of the equation "x+2z."

In operation 1044, the calculation engine substitutes the input parameter identified in operation 1042 for the specified variable of the equation. Continuing the example described above, the calculation engine 103 may obtain and substitute the data stored in cell A1 for the variable "x" of the equation "x+2z." In this example, the cell A1 contains the equation "B1+2y." Thus, the calculation engine substitutes "B1+2y" for variable "x" of the equation "x+2z." Accordingly, the calculation engine generates the substituted equation: "B1+2y+2z."

In operation 1046, the calculation engine evaluates the substituted equation generated in the perform substitution operation 1044 and determines whether that equation includes a reference to another cell. If the substituted reference does not include a reference to another cell, the method 1040 ends. If, however, the calculation engine 103 determines that the substituted equation includes a cell reference, the method 1040 proceeds to operation 1044. Thus, in continuation of the above example, the calculation engine 103 determines that the substituted equation includes cell reference B1 and therefore returns to the perform substitution operation 1044 to obtain and substitute the data stored in cell B1 for the cell reference "B1" of the substituted equation "B1+2y+2z." This iterative process continues until each cell reference is obtained and substituted and a final, substituted equation is generated.

Concept 4: Evaluation

Further aspects provide a spreadsheet application 104 with the ability to evaluate and simplify equations. In particular, the math engine 105 can identify when an equation could be simplified, simplify the equation, provide an option to display the simplified equation, or provide an option to display a step-by-step analysis to obtain that simplified equation. Further aspects provide a corresponding, detailed explanation of the simplification. Aspects of the present disclosure also provide a new spreadsheet function that can receive an equation as an input, and output a simplified result.

Correspondingly, the math engine 105 can also identify when an equation could be evaluated to a final result, evaluate the equation, provide an option to display the result, or provide an option to display a step-by-step analysis to obtain that result. Further aspects provide a corresponding, detailed explanation of the evaluation. In some embodiments, the math engine 105 can both simplify and evaluate the equation.

Figure 11A:
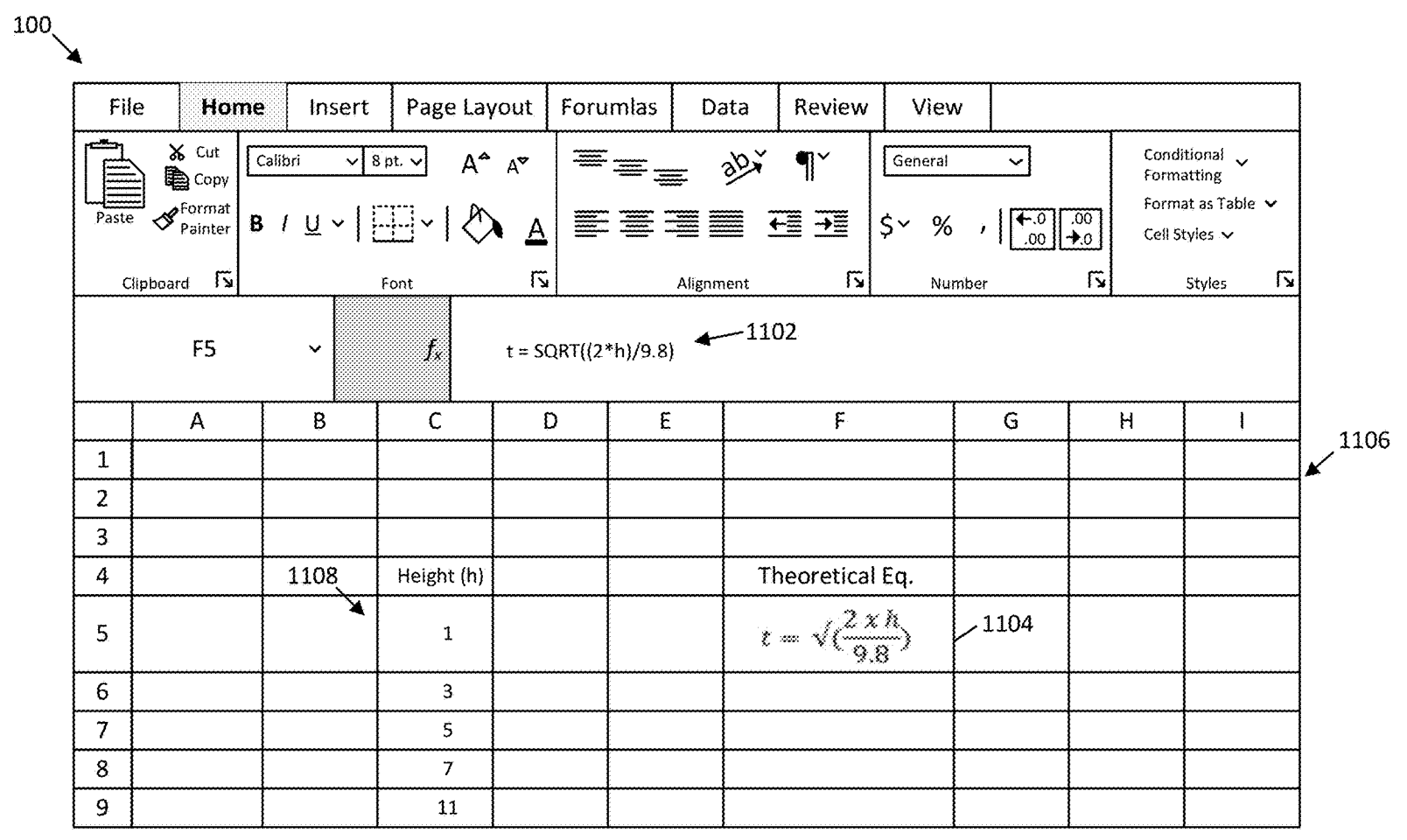
Figure 11B:
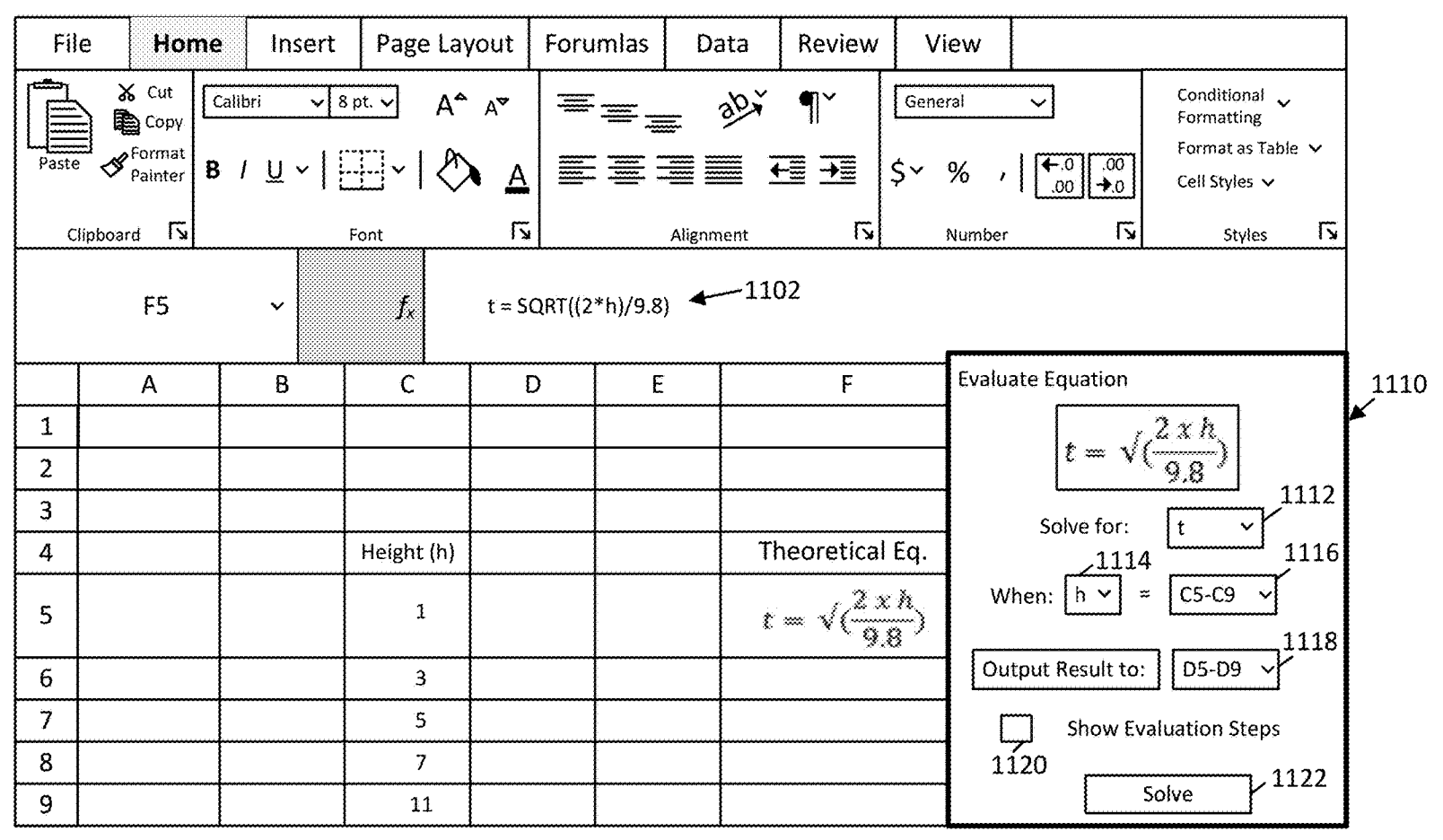
Figure 11C:
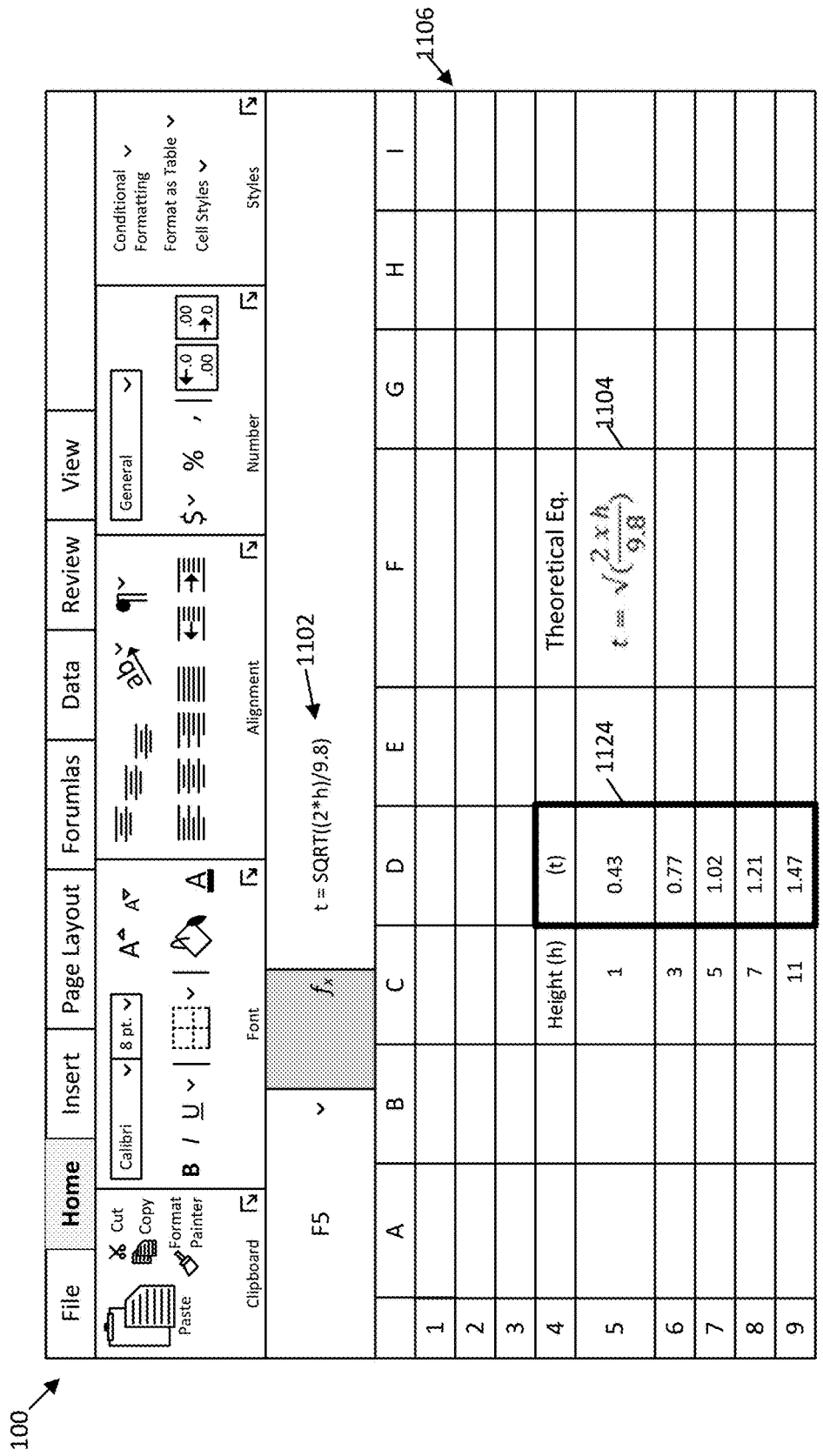
FIG. 11C illustrates the results of the evaluation of the equation illustrated in FIG. 11A and FIG. 11B.

Referring now to FIG. 11A, illustrated is a mathematical equation 1102 provided in cell F5 1104. The math engine 105 can evaluate equations having variables and equations without variables. For equations with no variables, the math engine 105 can evaluate the equation to a final result. For equations with variables, the math engine 105 can receive a numerical value, an array of numerical values, or one or more equations as parameters for each variable. Furthermore, one or more of those inputs might be stored in a cell and other inputs might not be not stored in a cell. Alternatively or additionally, the spreadsheet application 104 can receive a selection of one or more cells as parameters to each variable. In such an example, the one or more selected cells may include a numerical value, an array of values, another equation, or a reference to another cell. For the selected cells that include a numerical value or an array of values, solving the equation may involve the calculation engine 103 obtaining the data stored in the selected one or more cells and passing the information to the math engine 105. The math engine 105 may substitute the received numerical value or array of values for the variable, solve the equation, and output the solution to a cell or another display such as a floating object. In some embodiments, the resulting value may displayed as a graph. For a single numerical value, the math engine 105 would output a single result, and for an array of values, the math engine 105 may output an array of values equivalent to the size of the array. For selected cells that include an equation, solving the original equation may involve the math engine 105 substituting the variable in the original equation with equation stored in the selected cell. If that equation includes a reference to another cell, the calculation engine 103 may obtain the data stored in the referenced cell and pass that information to the math engine 105. If that equation has one or more additional variables, the spreadsheet application 104 may receive a selection of one or more cells as parameters for each variable, as described herein. Accordingly, the disclosed spreadsheet application 104 can evaluate and simplify equations using the calculation engine 103 and the math engine 105 in combination.

Referring back to FIG. 11A, illustrated is an equation 1102 written in spreadsheet notation (i.e., notation using spreadsheet-specific terms), however it is understood that the equation 1102 may be provided in mathematical notation (i.e., notation using mathematical expressions). In this example, the equation 1102 includes two variables: "t" and "h." The spreadsheet 1106 further includes a list of values 1108 stored in multiple cells (e.g., cells C5-C9). The user may specify one or more values from the list of values 1108 as parameters to the one or more variables of the equation 1102. For example, the user may specify one or more values under "Height (h)" from the list of values 1108 as corresponding to the "h" variable in the equation 1102. Such specification of values as input parameters to variables may be performed through a user experience that allows the user to select a cell, cells, or a range of cells as input parameters to the variables of an equation. Additionally or alternatively, the values and variables in the equation may be tokenized and therefore understood by the spreadsheet application as being a specific type of data. In some embodiments, tokenization of one or more values may refer to applying a rich data type to that value. Generally, a value being of a rich data type is defined as a type of data that has context and established relationships with other types of data. Accordingly, a rich data type is a value having associated context, which may be units (e.g., inches, miles, meters, kilograms, seconds, joules, hertz, Fahrenheit, etc.) or other information about the data's type (e.g., city, stock, NCAA football team, car, restaurant, school, etc.). A rich data type is a type of value that is further described in U.S. Provisional Patent Ser. No. 62/249,869 and U.S. Provisional Patent Ser. No. 62/357,284, the disclosures of which are fully incorporated herein by reference. Accordingly, values that are rich data types provide the spreadsheet application with context and an understanding of relationships about those values so that the spreadsheet application can provide intelligent suggestions using such values. For example, the data values 1108 entered in cells C5-C9 may be tokenized as a type "distance" while other data (not shown) may be tokenized as a type "time." Moreover, the values "h" and "t" in the equation 1102 may also be of type "distance" and "time," respectively. Such tokenization of values enables the spreadsheet application 104 to recognize the type of values stored in the spreadsheet 1106 in order to provide suggestions to the user. In particular, by understanding that the values 1108 are of type "distance," the spreadsheet application 104 can, in an example, suggest such values to associate with the variable "h" in the equation 1102, which is also of the same type. Accordingly, by tokenizing values and variables, the spreadsheet application 104 can understand the type of data stored in the spreadsheet to provide intelligent suggestions. Still further, by understanding the type of values and variables in an equation, the spreadsheet application 104 can identify errors when associating a variable with data having an incompatible type.

Referring now to FIG. 11B, illustrated is an exemplary spreadsheet application 104 capable of simplifying and evaluating mathematical equations. In this particular example, the spreadsheet application 104 provides an exemplary evaluation user experience 1110. The evaluation user experience 1110 provides the user with an option to evaluate the equation 1102. In this example, the evaluation user experience 1110 includes a first drop-down menu 1112 allowing a user to select a particular variable for which to solve (e.g., "t"). Because the equation includes a second variable (i.e., "h"), in order to evaluate the equation 1102 to a final result, one or more parameters associated with that variable must be specified. If, in an example, a parameter is not specified, the spreadsheet application 104 can solve the equation such that solution includes that variable. In this example, the evaluation user experience 1110 includes a second drop-down menu 1114 allowing the user to select a variable of the equation and a third drop-down menu 1116 allowing the user to specify one or more parameters for the variable identified in the second drop-down menu 1114 (e.g., "h"). It is understood that if an equation includes additional variables, then additional drop-down menus used to specify parameters would also be available. Alternatively, if an equation only includes one variable for which to solve, then the evaluation user experience 1110 would include fewer drop-down menus. The evaluation user experience 1110 in this example further includes a fourth drop-down menu 1118 allowing a user to select the one or more cells in which to output the results of the evaluation. The evaluation user experience 1110 further includes a selection box 1120 that, if selected, provides the option to display each of the evaluation steps. Finally, this example illustration of the evaluation user experience 1110 includes a solve button 1122 that when selected, evaluates the equation based on the user's selected criteria. Although the evaluation user experience 1110 describes the use of one or more drop-down menus and selection boxes, it is understood that such use of drop-down menus and selection boxes is not intended to be limiting, however is merely exemplary and that other user experiences may also be implemented.

In the present example, the user selected "t" as the variable for which to solve, as indicated in the first drop-down menu 1112. The user further specified evaluation criteria. In this particular example, the user specified that the variable "h" corresponds to the values stored in cells C5-C9 as indicated by the second drop-down menu 1114 and the third drop-down menu 1116, respectively. The user also specified cells D5-D9 as the corresponding cells to output the results, as indicated by the fourth drop-down menu 1120. Accordingly, based on a selection of the solve button 1122, the results 1124 are displayed in cells D5-D9 of FIG. 11C. Accordingly, because the user specified five values as parameters for the single unknown variable "h" of equation 1102, the result 1124 output by the spreadsheet application 104 also includes five values. Accordingly, aspects of the present disclosure also include the ability to provide ranges of values as parameters to an equation, resulting in multiple values. For example, multiple cells, data tables, and arrays can be passed to a math equation for evaluation, and that math equation may output, as a result, multiple values, a table, an array, or a graph.

In alternative embodiments, the evaluation results may not be output into one or more cells, but instead may be output as an object that is not tied to a cell. For example, the object may be a floating object that is displayed above the cells of the spreadsheet. In such an example, the floating object, although not tied to a particular cell reference, may be used in further calculations or referenced, thereby maintaining calculation integrity. In other embodiments, the object may be provided in a separate spreadsheet or exported to another application.

Figure 11D:
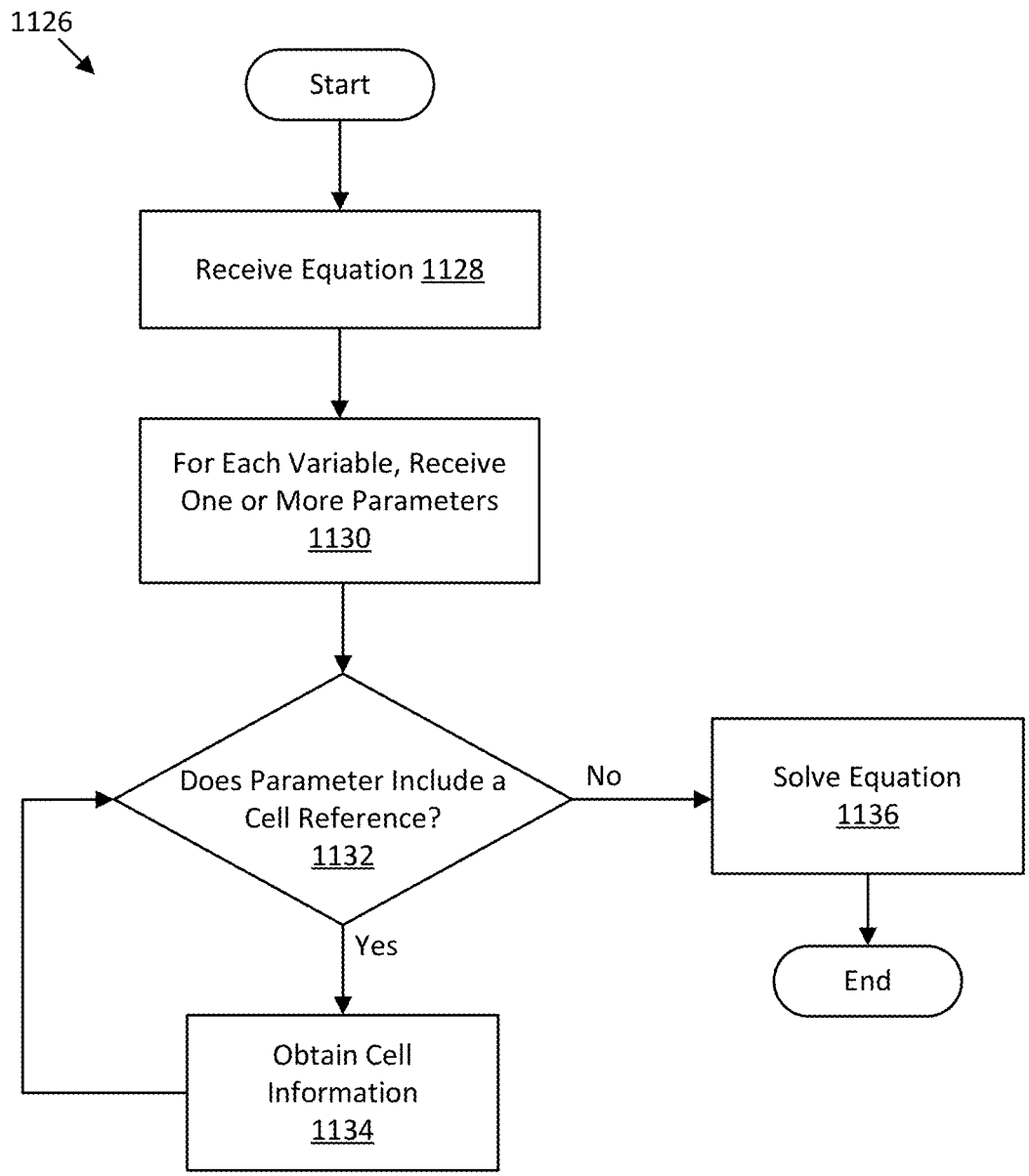
FIG. 11D illustrates a method for solving math equations.

FIG. 11D illustrates a method 1126 for solving math equations.

The method 1126 starts at the start operation and proceeds to operation 1128. At operation 1128, the spreadsheet application receives an equation in a cell. As described herein, the equation may include one variable. In some embodiments, the equation received includes more than one variable. In such embodiments, in operation 1128, the math engine 105 receives a variable for which to solve. In some embodiments, the equation includes no variables, in which case the math engine 105 may solve the equation.

In operation 1130, for each variable of the equation received in operation 1128, the math engine 105 receives one or more parameters. In an example, the received equation may include two variables: variable x and variable y, wherein variable y is selected as a variable for which to solve. Accordingly, in operation 1130, the math engine 105 may receive one or more input parameters for variable x. In other embodiments, the equation only includes a single variable. As described herein, the one or more parameters may be selected using a user experience that allows the user to select a cell, cells, or a range of cells as input parameters to the one or more variables of the received equation. Such an example user experience is illustrated in FIG. 11B. In other embodiments, input parameters may be tokenized and understood by the spreadsheet application as being input parameters to the one or more variables of the equation.

In operation 1132, the calculation engine 103 determines whether one of the received parameters includes a cell reference. In particular, if the input parameter includes a reference to another cell, the calculation engine 103 may obtain the data stored in the referenced cell in order to solve the equation. Accordingly, if one or more received parameters includes a reference to a cell (e.g., YES at operation 1132), the method flows to operation 1134 wherein the calculation engine 103 obtains data stored in each referenced cell. In particular, the calculation engine 103 may obtain the data stored in each referenced cell, which might be, for example a number or another equation. If the data stored in the referenced cell is a number, the calculation engine 103 obtains that number. If, alternatively, the data stored in the referenced cell is another equation including, for example, another cell reference (e.g., "B4" or "SUM(B4, 5)"), the calculation engine 103 further retrieves the data stored in that referenced cell. Accordingly, the calculation engine 103 iteratively retrieves data until all such data is retrieved.

Once all data is retrieved (e.g., NO at operation 1132), the method 1126 flows to operation 1136 in which the math engine 105 uses the values obtained by the calculation engine 103 to solve the equation. In some embodiments, the output to the equation is a single value or multiple values, depending on the number of input parameters received for each variable.

Figure 12A:
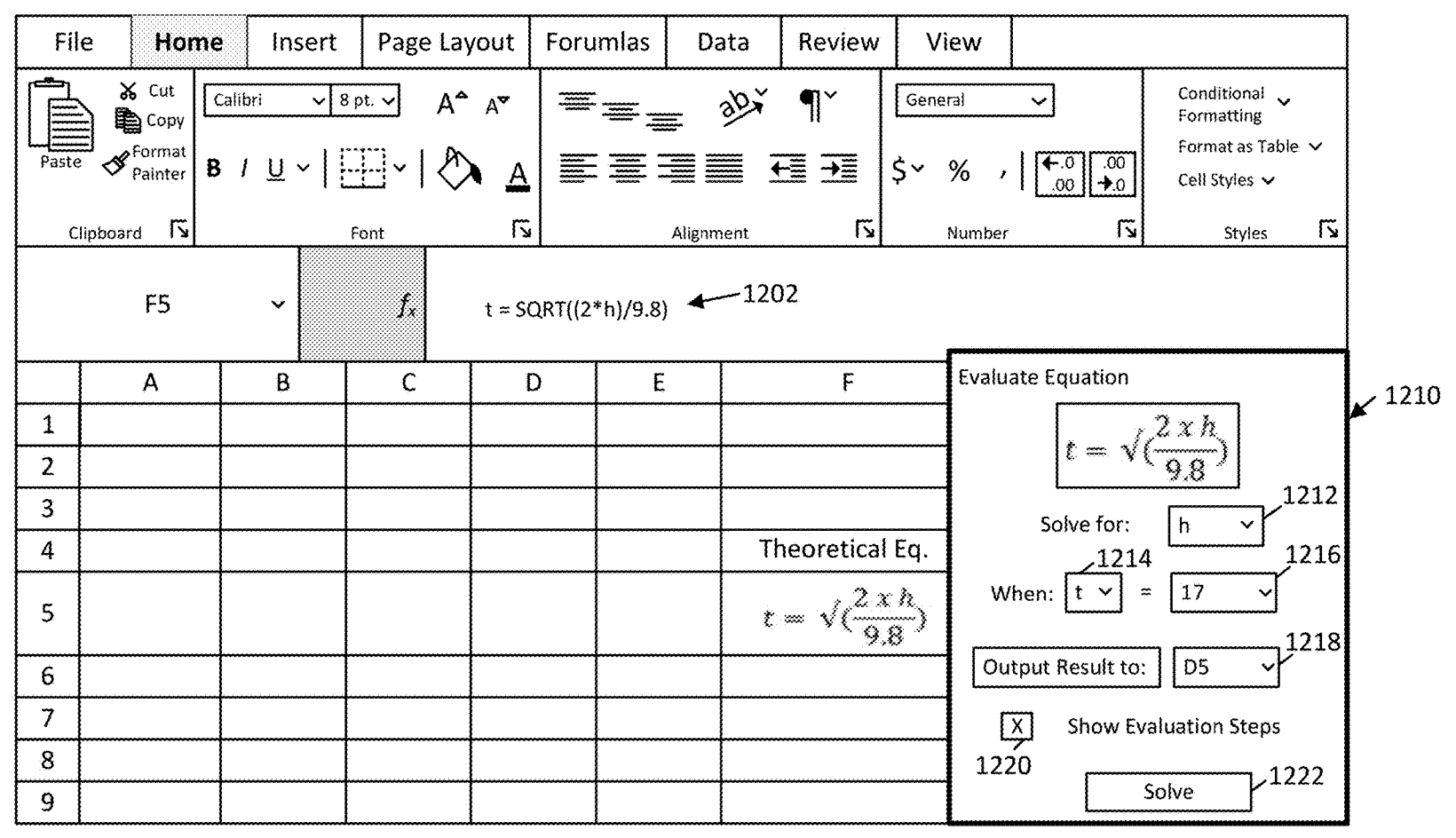

Aspects of the present disclosure further disclose the display of each step in the evaluation process. Referring now to FIG. 12A, illustrated is an exemplary spreadsheet application 104 having mathematical evaluation functionality. In particular, FIG. 12A illustrates an evaluation user experience of the disclosed spreadsheet application. Similar to the example illustrated in FIGS. 11A-11C, the example evaluation user experience 1210 allows the user to solve for a particular variable (e.g., "h") and allows the user to provide the parameters of other variable(s) (e.g., "t") of the equation 1202. The example evaluation user experience 1210 also provides the option to display each step in the evaluation process. As illustrated, the user has chosen to solve for "h," as indicated by the first drop-down menu 1212 when the variable "t" equals "17" as indicated by the second drop-down menu 1214 and the third drop-down menu 1216, respectively. Furthermore, as indicated by the selection box 1220, the user has chosen to display each evaluation step.

Figure 12B:
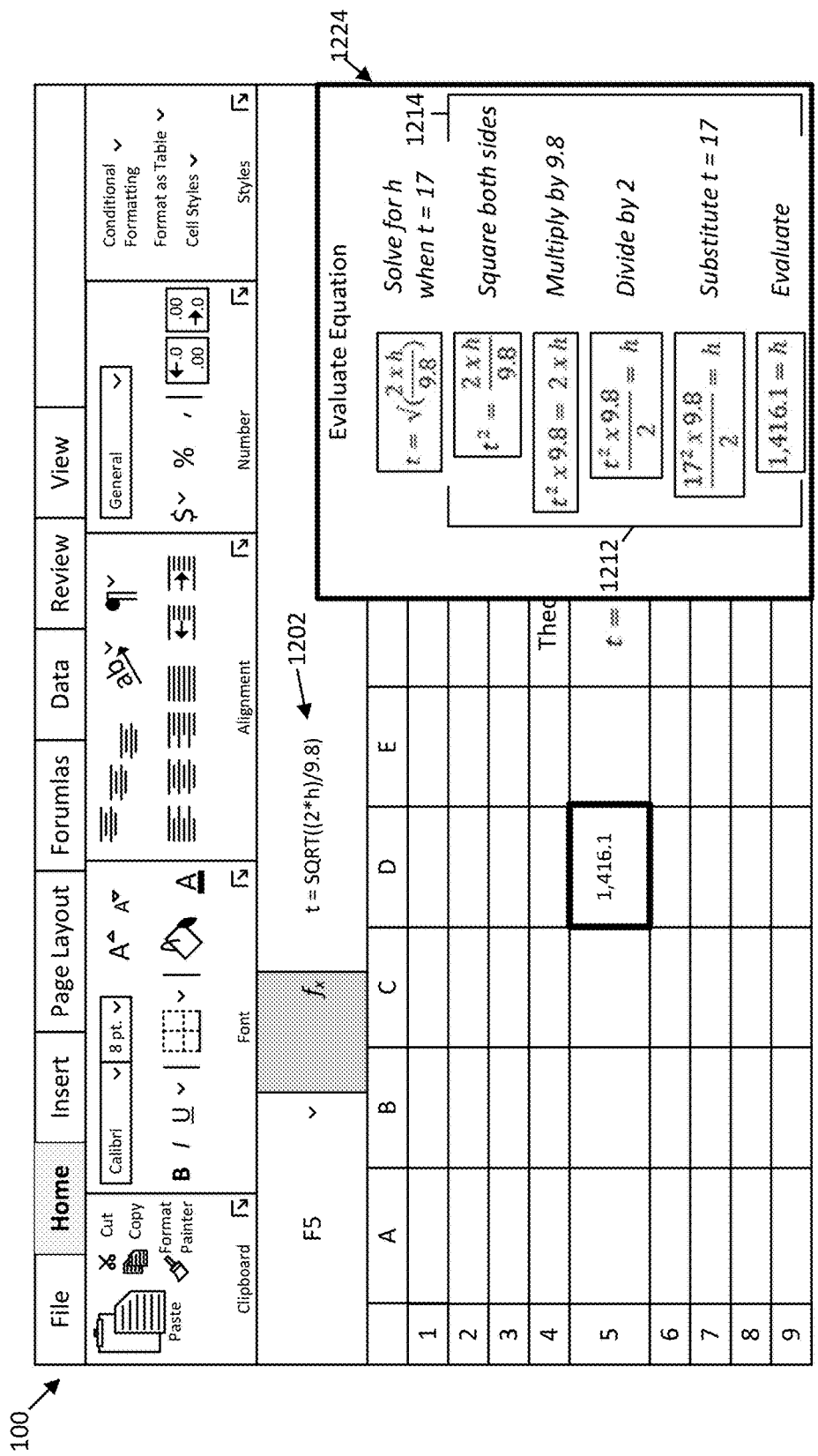
FIG. 12B illustrates the evaluation steps of the evaluation user interface illustrated in FIG. 12A.

FIG. 12B illustrates the evaluation steps of the evaluation user interface illustrated in FIG. 12A. Based on a user's selection of the solve button 1222 of FIG. 12A, the evaluation steps are displayed in an evaluation user interface 1224. As illustrated, the evaluation user interface 1224 displays each step associated with evaluating the equation 1202. In this example, the user sought to evaluate the variable "h" while providing 17 as the parameter for variable "t." Accordingly, displayed in the evaluation user interface 1224 are each of the five steps 1212 to evaluate the equation 1202 to a final answer. Also displayed in the evaluation user interface 1224 are explanations 1214 associated with each evaluation step. It is understood that although example aspects illustrate a particular evaluation user interface 1224, this disclosure is not limited to the particular user interface and any such user interface may be implemented.

Although the examples illustrate the simple evaluation of an equation, aspects further disclose the evaluation of an equation that might depend on other equations or values stored in the spreadsheet. For example, the concepts further disclose the evaluation and the corresponding step-by-step display, of an equation that comprises one or more nested equations that may each be dependent upon other equations or dynamic data stored in the spreadsheet. The evaluation of such an equation, therefore, might comprise the evaluation of other equations in order to evaluate the specified equation. Further aspects include iteratively solving an equation to a minimum or a maximum value.

Concept 5: Show Dependencies

Further novel aspects of the present disclosure provide a spreadsheet application 104 that displays dependencies among data stored in a spreadsheet. Spreadsheet applications 104 may store thousands of values and equations in a single spreadsheet, making it difficult for a user to understand how data may depend on, or affect other data stored therein. Accordingly, aspects of the present disclosure further provide an intuitive display for showing dependencies among data stored in a spreadsheet.

Figure 13A:
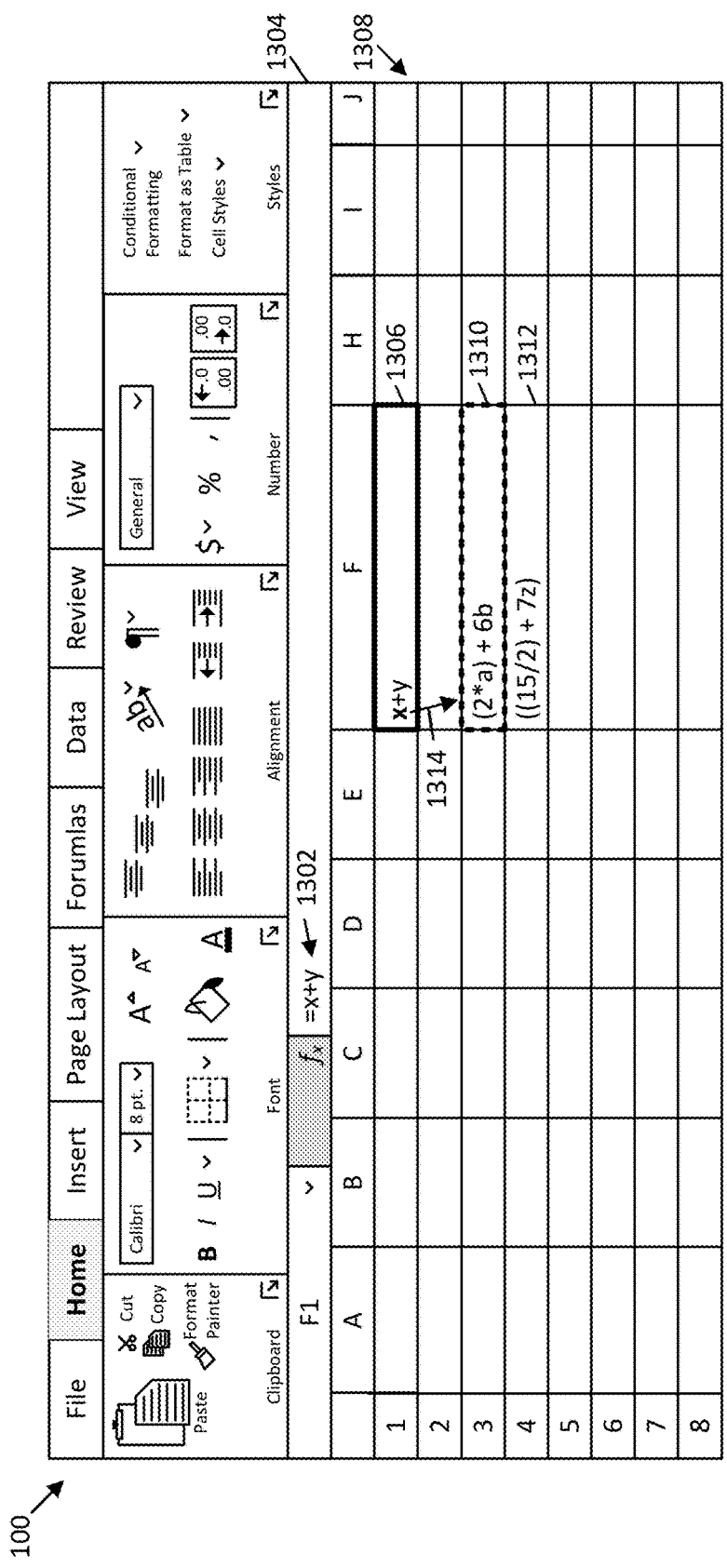
FIG. 13A illustrated is an example display of dependencies for a single variable of an equation stored in the spreadsheet.

Referring now to FIG. 13A, illustrated is an example display of dependencies for a single variable of an equation stored in the spreadsheet. In particular, equation "x+y" 1302 is provided in the formula bar 1304 and is stored in cell F1 1306 of the spreadsheet 1308. In this example, the variables "x" and "y" may each be dependent upon data stored in one or more other cells. For example, the equation stored in cell F3 1310 may be selected as the parameter for variable "x," and the equation stored in cell F4 1312 may be selected as the parameter for variable "y." The spreadsheet application 104 may display such dependencies based on a selection of an option to show such relationships. More particularly, in this example, the user has selected an option to display the one or more dependent relationships of the variable "x." Accordingly, as illustrated in FIG. 13A, the spreadsheet application 104 displays the dependency of variable "x" to cell F3 1310 using arrow 1314. Although an arrow 1314 is illustrated, it is understood that other types of indicators may be used, such as a line, coloring, font size, font type, etc. Furthermore, in this embodiment, the variable "x" is bolded and cell F3 1310 is also emphasized with a dashed border to further indicated that "x" is dependent on the value stored in cell F3 1310. In other embodiments, a variable might be related to only part of the data stored in a cell. For example, a variable may be related to a single variable of an equation stored in another cell. Accordingly, aspects disclose displaying the dependent relationship of a variable to the relevant portion of the data stored in the cell rather than the entire cell, which is further described and illustrated herein.

Figure 13B:
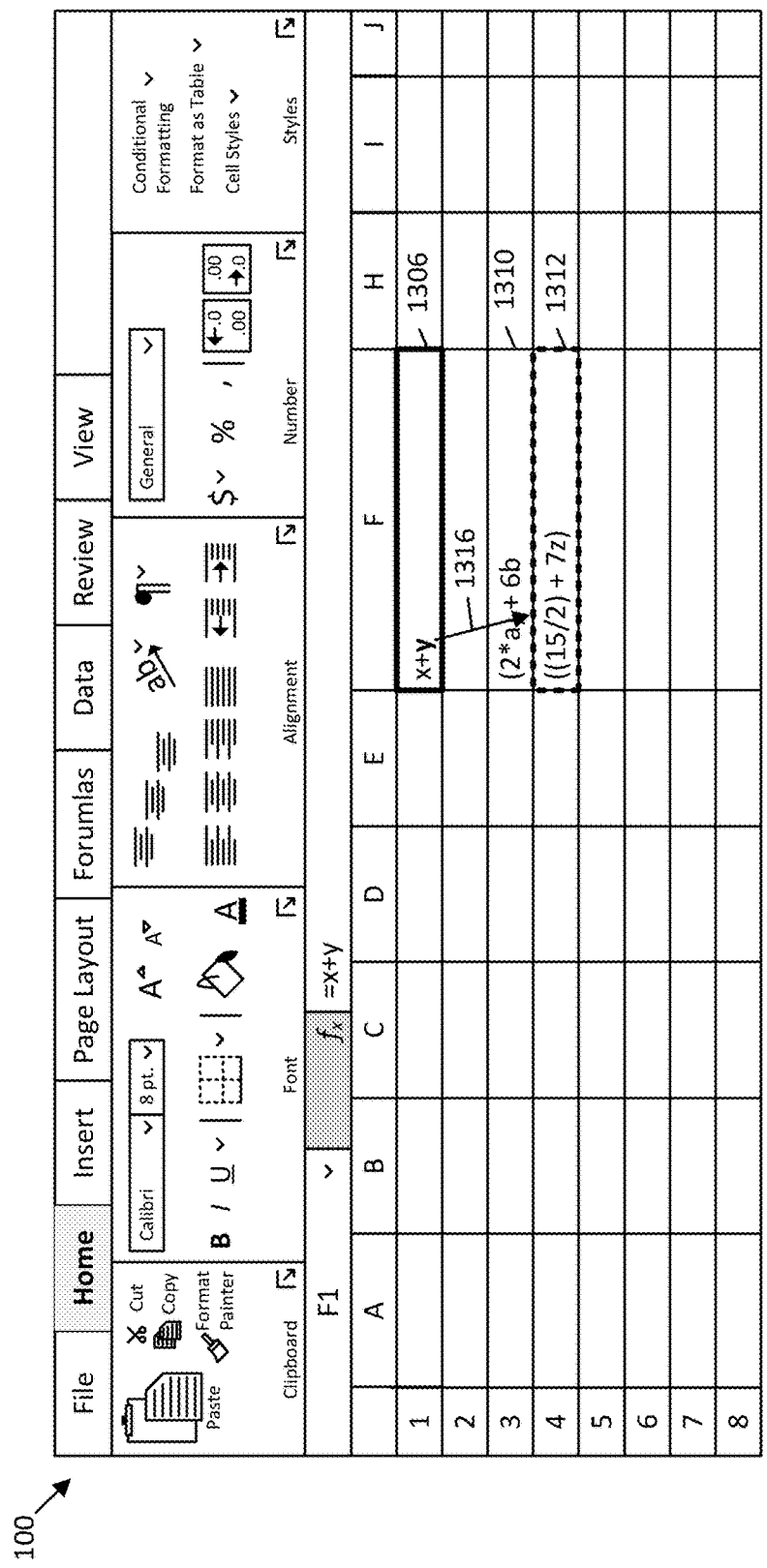
FIG. 13B illustrates another example display of dependencies, as related to FIG. 13A.

FIG. 13B illustrates another example display of dependencies, as related to FIG. 13A. As described in this example, the variable "x" is dependent upon data stored in cell F3 1310 and the variable "y" is dependent upon data stored in cell F4 1312. Similar to the example illustrated in FIG. 13A, the spreadsheet application may also display the dependent relationship of the variable "y" to the data stored in cell F4 1312 using arrow 1316. As further illustrated, the variable "y" is bolded and cell F4 1312 is emphasized with a dashed border to further indicated that "y" is dependent on the value stored in cell F4 1312. Although FIG. 13A and FIG. 13B illustrate the display of dependencies individually, aspects of the present disclosure are also directed to simultaneously displaying multiple dependencies. As such, the dependent relationship of variable "x" and the data stored in cell F3 1310 may be displayed simultaneously with the dependent relationship of the variable "y" and the data stored in cell F4 1312.

Figure 13C:
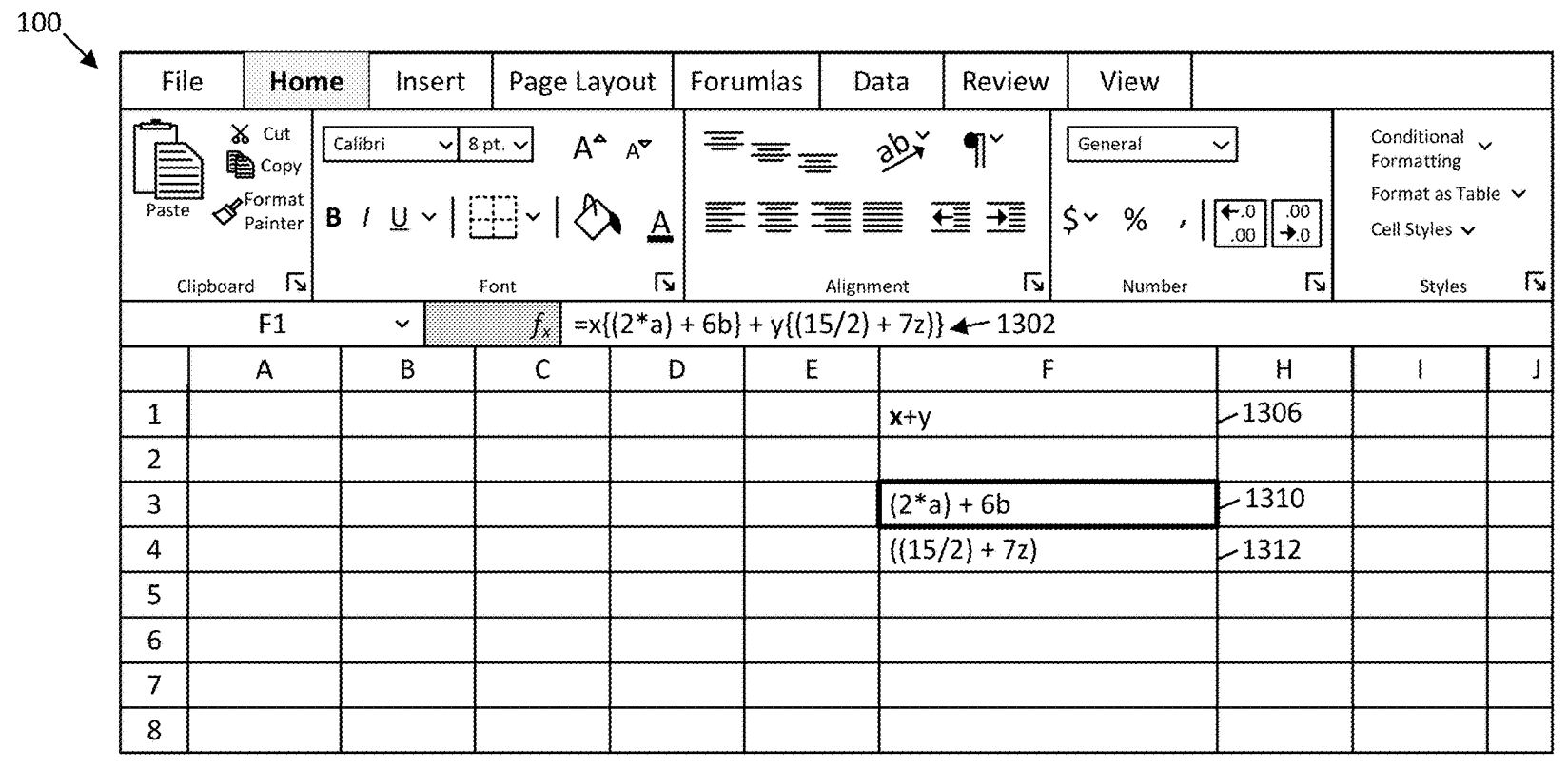

Further aspects provide the display of dependencies in the formula bar. In particular, the formula in the formula bar may refer to a cell reference to indicate the cell or cells that each variable is dependent upon or it may provide the actual value itself, including any cell references therein. Referring now to FIG. 13C, illustrated is an example in which dependencies are displayed in the formula bar. As illustrated, the equation "x+y" is stored in cell F1 1306 of the spreadsheet 1308. As described herein, the variable "x" is dependent upon data stored in cell F3 1310 (e.g., the equation "(2*a)+6b)") and the variable "y" is dependent upon data stored in cell F4 1312 (e.g., the equation "((15/2)+7z)"). In this example, the dependency for both variables "x" and "y" is displayed in the formula bar by displaying the corresponding value. In particular, the example formula 1302 provided in the formula bar 1304 is written as "=x{(2*a)+6b}+y{(15/2)+7z)}." Accordingly, the value associated with variable "x" and the value associated with variable "y" is provided in brackets adjacent to each respective variable. In other embodiments, however, the cell reference itself may only be provided. Yet in other embodiments, arrows may be provided, similar to the example illustrated in FIG. 13A and FIG. 13B.

Figure 14A:
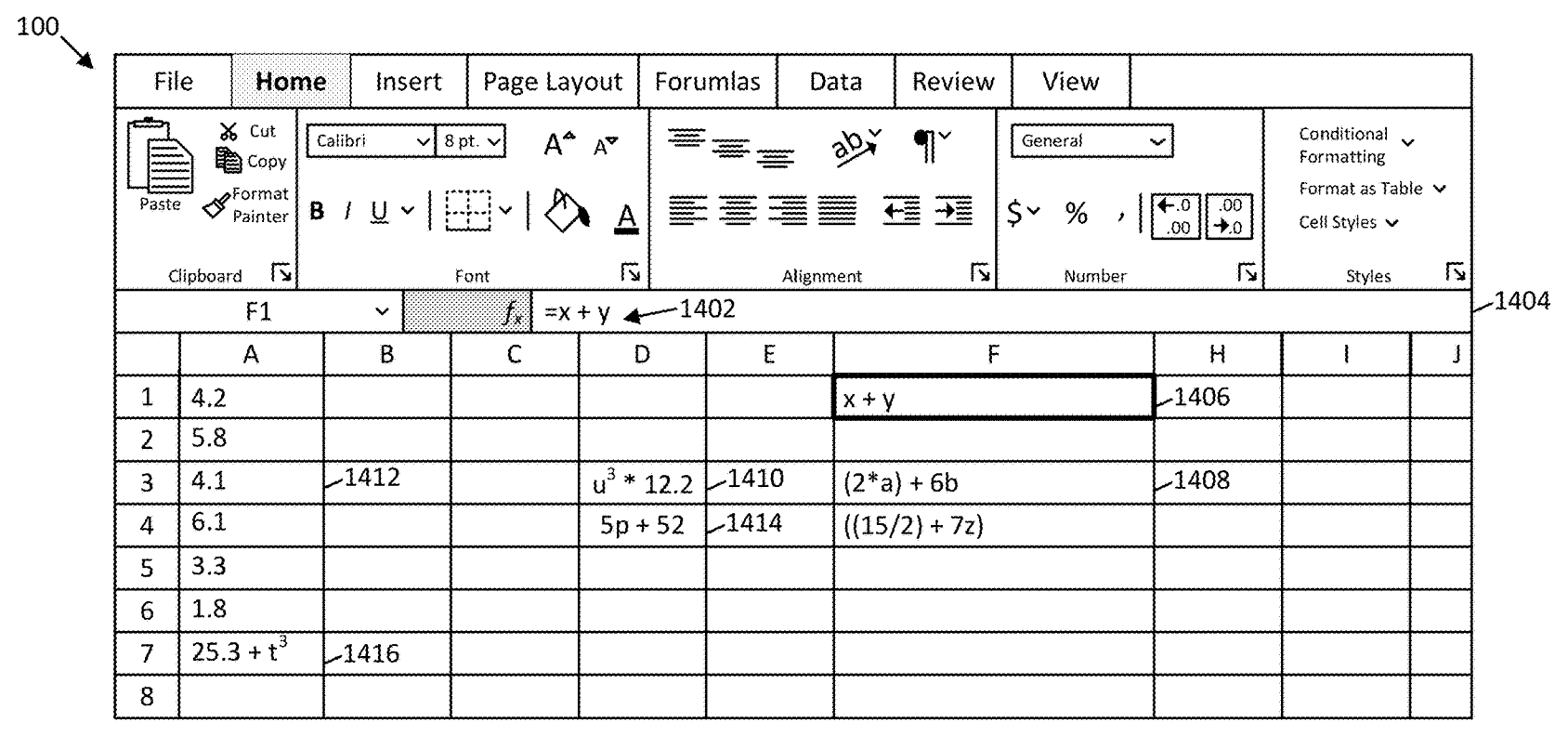
Figure 14B:
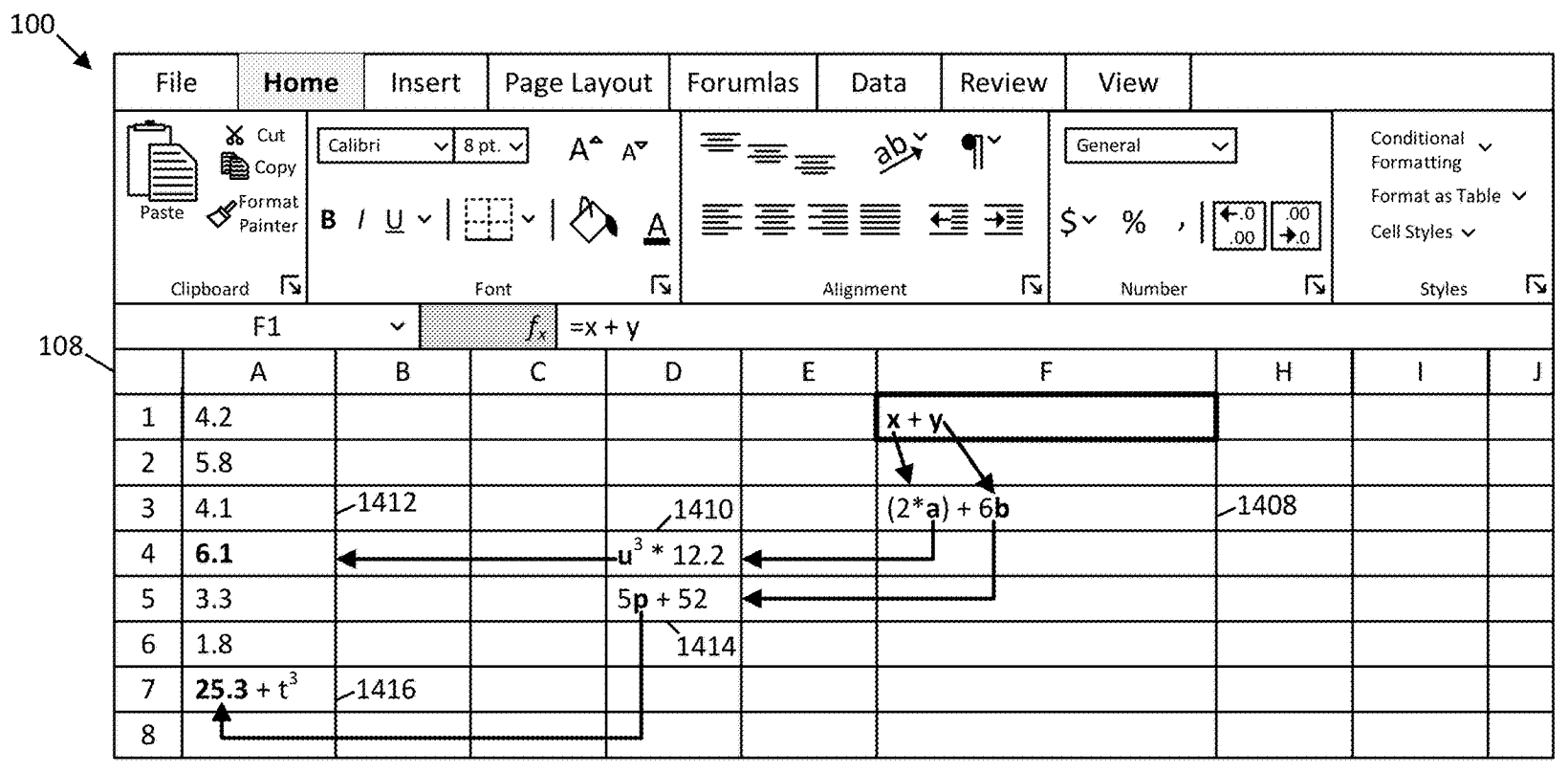

FIG. 14A and FIG. 14B provide the display of dependent relationships among multiple variables. Illustrated in FIG. 14A is a formula 1402 provided in the formula bar 1404 and stored in cell F1 1406. The formula includes two variables: x and y. In this example, each variable is associated with data stored in multiple cells or portions of cells throughout the spreadsheet. In particular, variable "x" is associated with the variable "a" stored in cell F3 1408. Furthermore, variable "a" is associated with cell D4 1410. Cell D4 1410 includes equation "$u^3*12.2$," wherein variable "u" is associated with cell A4 1412. Furthermore, variable "y" is associated with variable "b" stored in cell F3 1408. Variable "b" is associated with cell D5 1414. Cell D5 1414 includes equation "5p+52," wherein variable "p" is associated with cell A7 1416. As can be readily understood, dependencies can become quite complex and spread throughout the spreadsheet.

FIG. 14B illustrates an example display of dependent relationships among multiple variables stored in multiple cells, as described with reference to FIG. 14A. As illustrated in this example, multiple arrows are used to show multiple dependencies throughout the spreadsheet. In particular, arrows are used to show dependencies to variables and to individual cells. Although arrows are illustrated, any such way to display dependencies may be implemented. Such display of dependent relationships allows a user to readily appreciate the variables and cells that are involved in an equation without manually tracing the associations, which can be cumbersome and complex. In other examples, a task pane may be provided that shows the values and dependencies for each variable. In other embodiments, a user interface may be displayed in response to selection of the variable or hovering over the particular variable.

Additionally, a cell may store a compound object. A compound object stores multiple values in a single cell, wherein those multiple values are organized according to a defined structure. A compound object is further described in U.S. Provisional Patent Ser. No. 62/249,884 and U.S. Provisional Patent Ser. No. 62/357,292, the disclosures of which are fully incorporated herein by reference. the disclosure of which has been incorporated herein by reference. In an example, a compound object stores at least one of: a mathematical equation and one or more values. In an example embodiment, a mathematical equation stored in a compound object has one or more variables that depend on one or more values stored in the compound object. In another example embodiment, a mathematical equation stored in a compound object has one or more variables that depend on values stored outside the compound object, such as in other cells or the spreadsheet or within other compound objects. In yet another example embodiment, a mathematical equation stored in a compound object has one or more variables that depend on values stored both inside and outside the compound object. Still further, a mathematical equation stored in a cell may have one or more variables that depend on values stored inside one or more compound objects. Accordingly, the disclosed spreadsheet application also displays dependencies of variables that are stored anywhere in the spreadsheet, including in a compound object. In some embodiments, these dependencies are displayed similar to the examples described herein. In other embodiments, the dependencies may be displayed differently, given the fact that a compound object stores multiple values and each of those values may not be fully displayed in the cell view.

Figure 14C:
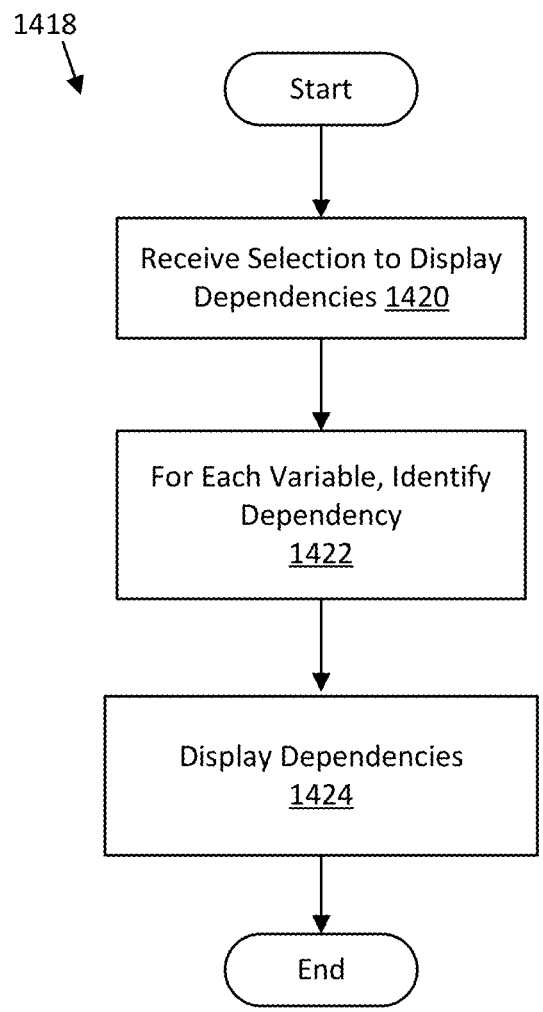
FIG. 14C illustrates a method 1418 for displaying dependencies.

FIG. 14C illustrates a method 1418 for displaying dependencies.

In particular, the method 1418 starts at a start operation and proceeds to operation 1420 in which the spreadsheet application receives an option to display one or more dependencies. As described herein, an equation may be provided in the spreadsheet wherein one or more variables of the equation is related to one or more cells or portions of cells also stored in the spreadsheet. Accordingly, aspects of the present disclosure provide the ability to display those dependencies. Thus, in operation 1420, the spreadsheet application may receive an option to display dependencies for a single variable of an equation or for multiple variables of an equation.

In operation 1422, for each variable for which a dependency is to be shown, the spreadsheet application identifies the one or more dependent relationships. As described herein, a variable may be related to one or more cells or portions of cells also stored in the spreadsheet. Furthermore, the dependent cell or portion of the cell may further include one or more variables that are also related to one or more cells or portions of cells stored in the spreadsheet. Accordingly, in operation 1422, the spreadsheet application identifies such dependencies.

In operation 1424, the spreadsheet application displays those dependencies. In some embodiments, dependencies are displayed using an arrow between a variable and its dependency or other indicators, such as a line, coloring, font size, font type, etc.

Concept 6: Provide Recommendations for how to Display and Analyze Data.

Figure 15:
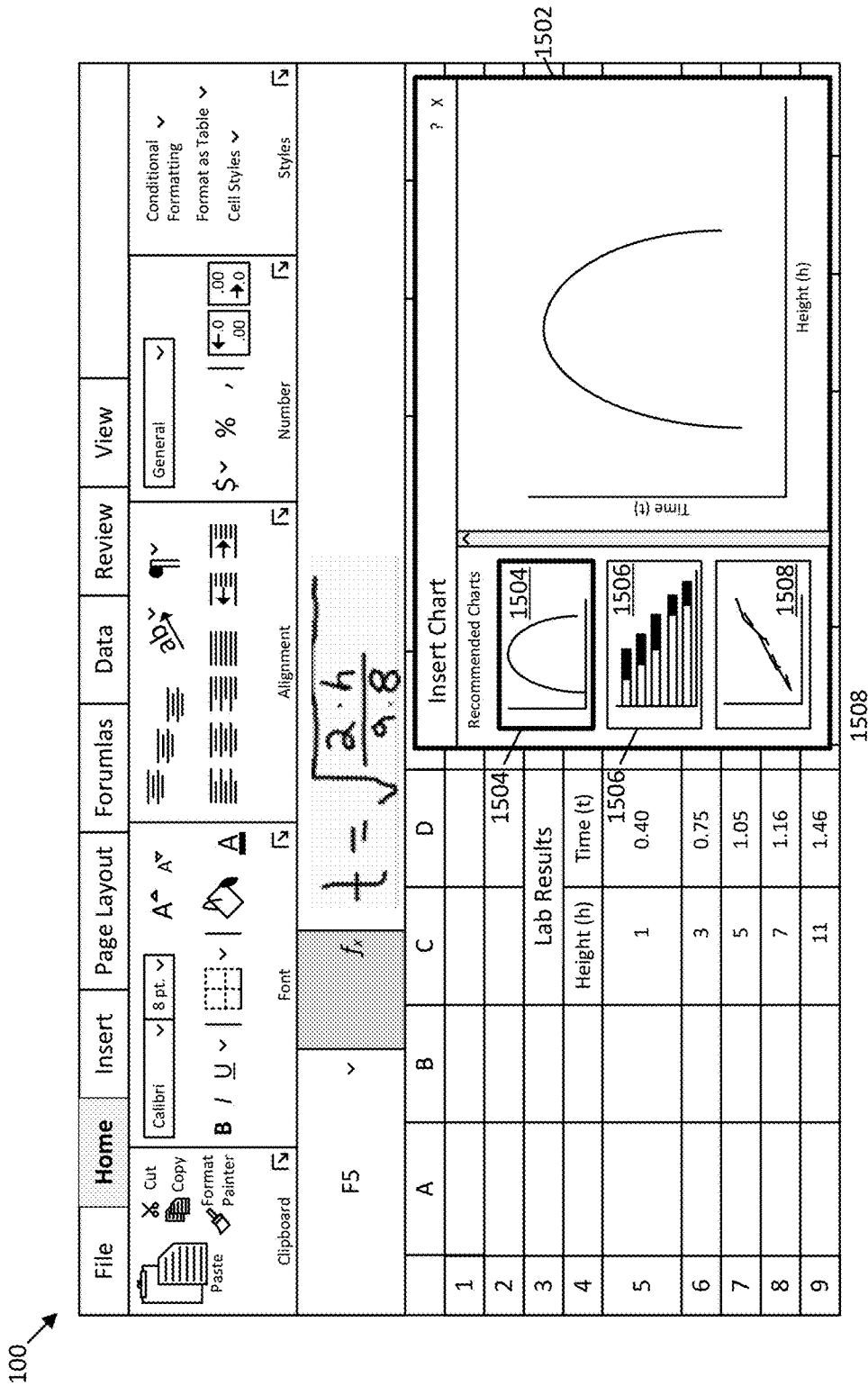
FIG. 15 illustrates an example spreadsheet application that is capable of providing recommendations for how to display data.

FIG. 15 illustrates an example spreadsheet application 104 that is capable of providing recommendations for how to display data. As described herein, the disclosed spreadsheet application 104 is capable of using a calculation engine and a math engine to analyze an equation and to even output a result of that equation. In particular, a cell, cells, or range of cells may be selected as input parameters to a variable in an equation. In some embodiments, the selected cell, cells, or range of cells may even include one or more variables or cell references. Accordingly, the spreadsheet application 104 may iteratively identify each dependency and populate the variables of the equation so that it can be solved or simplified. As described, the spreadsheet application may also receive more than one value as an input parameter for a variable, thereby providing more than one result.

Aspects of the present disclosure further provide a spreadsheet application 104 that may also provide recommendations for displaying the result of a mathematical equation. In the example illustrated in FIG. 15, the spreadsheet application 104 displays a recommended charts user interface 1502 that stores one or more charts that may be used to represent the data stored in the spreadsheet. In this example, the recommended charts user interface 1502 include a parabola 1504, a bar graph 1506, and a line bar graph 1508. The spreadsheet application 104 may also recommend other ways to represent the result such as, for example, plotting the result in a Cartesian coordinate system. Thus, although the example of FIG. 15 illustrates specific recommended charts 1502, the spreadsheet application 104 may also recommend other methods to represent data 110, such as, but not limited to flow charts, tables, diagrams, etc. In some embodiments, the spreadsheet application 104 may recommend different ways to plot data and equations, including 2D and 3D plots.

In some embodiments, the math engine 105 can generate a plot of a recognized equation stored in the spreadsheet. Chart options can be provided that allow users to specify the way in which the equation is plotted on a chart as well as options regarding the size, appearance, and style of the chart. Thus, aspects of the present disclosure further provide a spreadsheet application that provides plotting functionality.

Concept 7: Math Display Mode

Further aspects of the present disclosure also provide an equation display mode that assists users in entering equations, solving equations, and displaying solution steps without requiring any spreadsheet application experience. In an example, an equation display mode may be a display mode that causes a simple equation user interface to be displayed. In some embodiments, the equation user interface may be a blank user interface that allows a user to input one or more equations separate from, but tied to, a traditional spreadsheet user experience. In some embodiments, the equation user interface may be a blank user interface in which a user may ink or type in an equation. Alternatively or additionally, a user may input an equation by capturing a picture of an equation, which may be thereafter displayed from the equation user interface. Alternatively or additionally, an equation written in specialized tools may be imported via shared or open markup languages. In some embodiments, such an equation display mode may be a feature available on a mobile device such as a mobile phone or tablet computing device. Furthermore, the equation user interface may be associated with one or more cells of the spreadsheet, and thus, once the equation is provided, the spreadsheet application can enter that equation into a particular cell or range of cells of the spreadsheet.

Figure 16A:
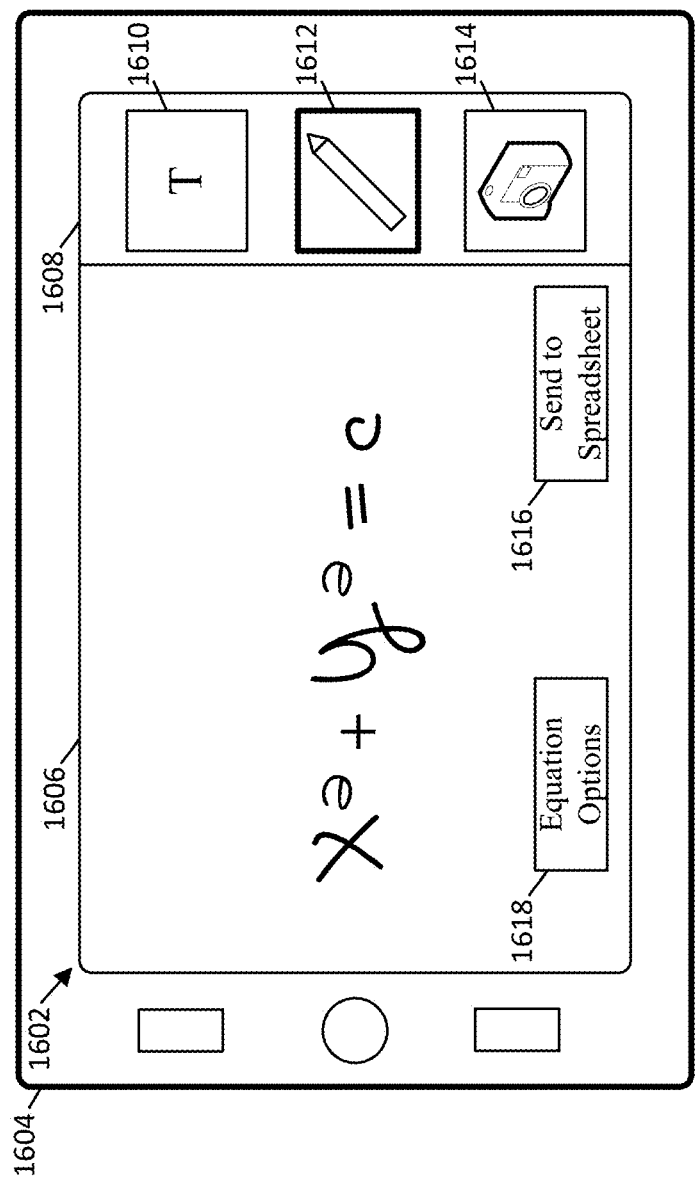
FIG. 16A illustrates an example equation user interface for entering an equation.

FIG. 16A illustrates an example equation user interface 1602 for entering an equation from a mobile computing device 1604. In this example, the mobile computing device 1604 may be, for example, a mobile phone or a tablet computing device that has the disclosed spreadsheet application stored thereon. Alternatively or additionally, the mobile computing device 1604 is capable of executing a hosted or online version of the spreadsheet application. As described herein, the user may execute the spreadsheet application on the mobile computing device 1604 and enter into the equation display mode in order to display the equation user interface 1602. The example equation user interface 1602 includes an equation input area 1606 and equation input options 1608. In this example, the equation input options 1608 provides three options to enter an equation: a text option 1610, an ink option 1612, and a photo option 1614. In other embodiments, other equation input options may be provided. The text option 1610 allows a user to type in the equation. In some embodiments, a digital keyboard may be provided, which may be used to enter the equation. The ink option 1612 allows a user to enter the equation in the equation input area 1606 using the user's finger or using a stylus, for example. The photo option 1614 allows a user to capture a photograph of an equation. In an example, selection of the photo option 1614 may enable the camera of the mobile computing device 1604. In one embodiment, based on a selection of the photo option 1614, the equation user interface 1602 may act as the camera display, allowing the user to capture a photograph of an equation that may be typed or written in a workbook, a book, or a piece of paper. In another embodiment, a user may have already captured a photo of an equation that is saved on or accessible by the mobile computing device 1604. In such an embodiment, the photo option 1614 may cause the mobile device 1604 to access such photos. In either embodiment, the photo of an equation may be read by the spreadsheet application and translated to an equation. A user may also have the option to correct any errors in the translated equation. The send to spreadsheet option 1616, if selected, may cause the spreadsheet application to enter that equation into a cell of a spreadsheet. In embodiments, the user may select the cell or cells and in other embodiments, the spreadsheet application may automatically select one or more cells in which to store the equation. Furthermore, the equation options 1618 may display a separate user interface that allows the user to enter in parameters for each variable or select parameters from the spreadsheet. Additionally or alternatively, the equation options 1618 may provide the user with the option to simplify or evaluate the equation. Furthermore, each provided parameter may also be stored in one or more cells of the spreadsheet. If simplification or evaluation of the equation is selected, the user may also select to view each individual step of the simplification or evaluation. Additionally or alternatively, the equation options 1618 may provide the user with the option to chart or plot the equation based on parameters provided.

Figure 16B:
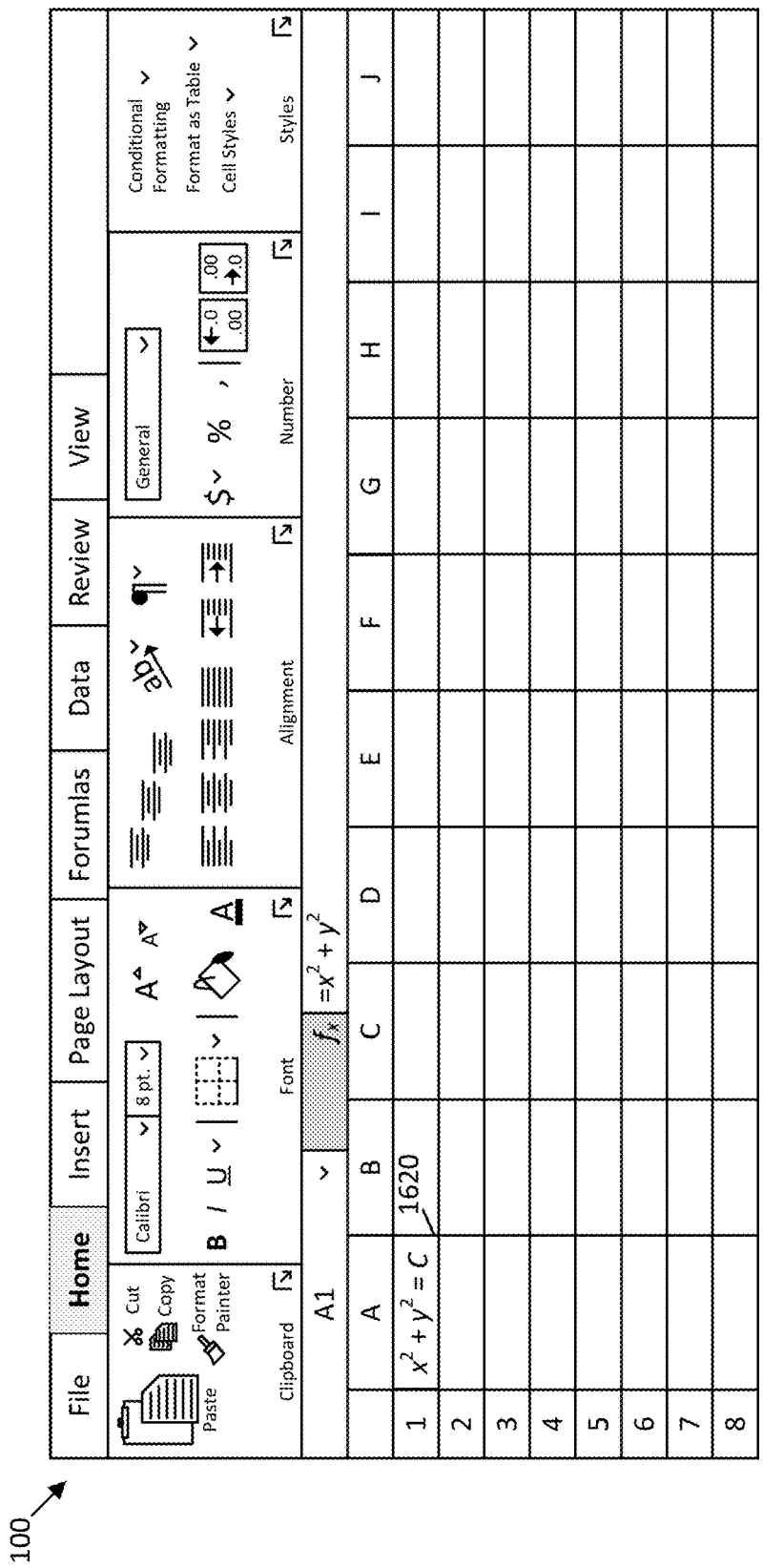
FIG. 16B illustrates an example spreadsheet storing the equation provided in the equation user interface of FIG. 16A.

In this example, the equation "$x^2+y^2=c$" is provided in the equation user interface 1602 using the ink option 1612. Based on a selection of the send to spreadsheet option 1616, the equation "$x^2+y^2=c$" is stored in cell A1 1620 of the spreadsheet, as illustrated in FIG. 16B. Accordingly, FIG. 16B illustrates an example spreadsheet storing the equation provided in the equation user interface of FIG. 16A. In an example, the spreadsheet application may set a default cell in which to store the equation received in equation user interface 1602 of the equation display mode. In other embodiments, the user may select the cell in which to store the provided equation. As described herein, in some embodiments, the equation may also be simplified or evaluated to a result. In embodiments in which the equation is simplified or evaluated to a result, the spreadsheet application may show each evaluation step. If parameters are provided, those parameters may also be stored in the spreadsheet. Additionally or alternatively, the spreadsheet application 104 may also provide the option to chart or plot the results of the equation, as described herein. Accordingly, the equation display mode provides a simple and easy way in which the user may enter an equation into the spreadsheet. The equation display mode also provides a simple way in which to simplify and evaluate an equation while also understanding each step of the simplification or evaluation process. The equation display mode also provides a simple and easy way in which to chart or plot the data.

FIGS. 17-20 and the associated descriptions provide a discussion of a variety of operating environments in which aspects of the disclosure may be practiced. However, the devices and systems illustrated and discussed with respect to FIGS. 17-20 are for purposes of example and illustration and are not limiting of a vast number of computing device configurations that may be utilized for practicing aspects of the disclosure, as described herein.

Figure 17:
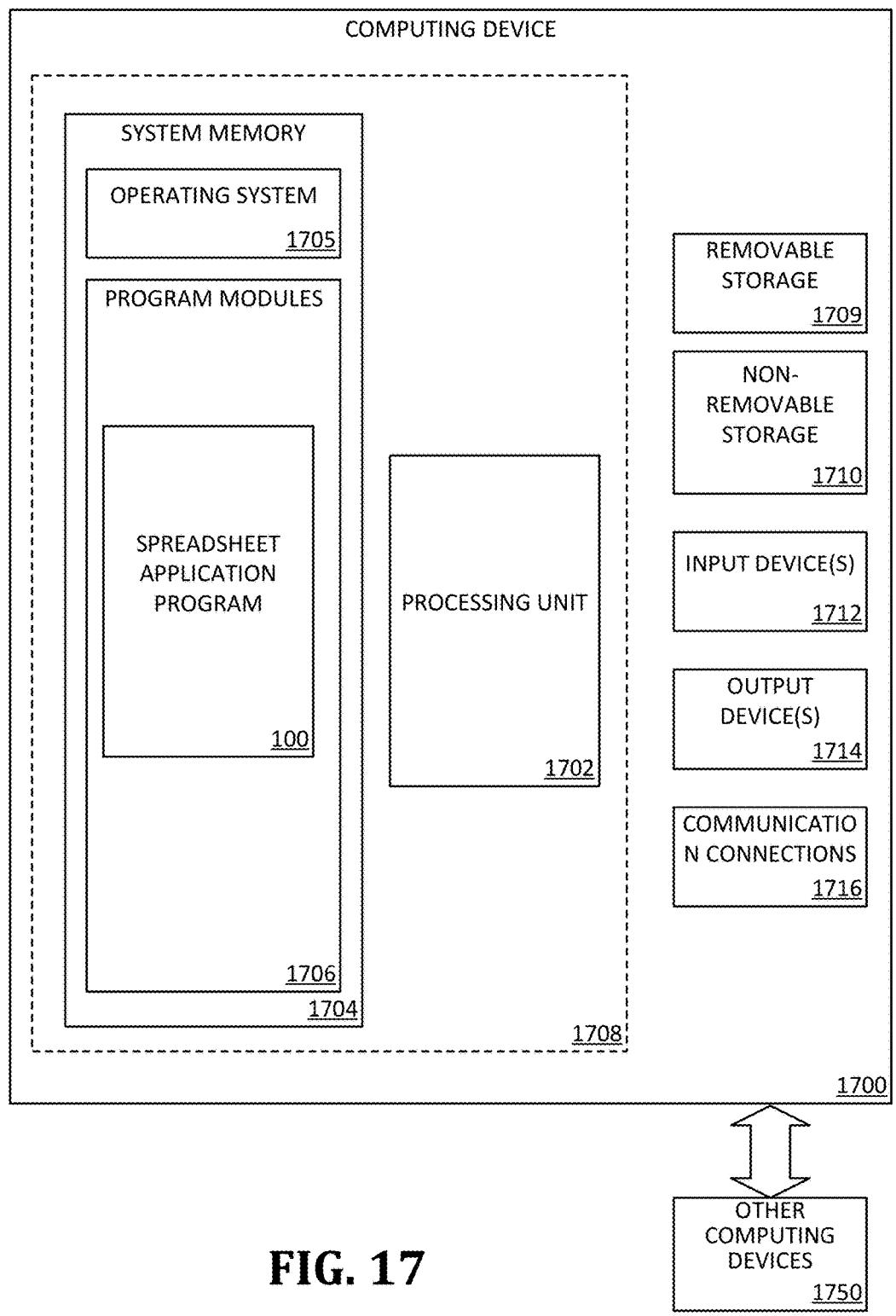
FIG. 17 is a block diagram illustrating example physical components of a computing device with which aspects of the disclosure may be practiced.

FIG. 17 is a block diagram illustrating physical components (e.g., hardware) of a computing device 1700 with which aspects of the disclosure may be practiced. The computing device components described below may have computer executable instructions for implementing a spreadsheet application program 104 on a computing device (e.g., server computing device 108), including computer executable instructions for the spreadsheet application program 104 that can be executed to employ the methods disclosed herein. In a basic configuration, the computing device 1700 may include at least one processing unit 1702 and a system memory 1704. Depending on the configuration and type of computing device, the system memory 1704 may comprise, but is not limited to, volatile storage (e.g., random access memory), non-volatile storage (e.g., read-only memory), flash memory, or any combination of such memories. The system memory 1704 may include an operating system 1705 suitable for running the spreadsheet application program 104 or one or more components in regards to FIG. 1. The operating system 1705, for example, may be suitable for controlling the operation of the computing device 1700. Furthermore, embodiments of the disclosure may be practiced in conjunction with a graphics library, other operating systems, or any other application program and is not limited to any particular application or system. This basic configuration is illustrated in FIG. 17 by those components within a dashed line 1708. The computing device 1700 may have additional features or functionality. For example, the computing device 1700 may also include additional data storage devices (removable and/or non-removable) such as, for example, magnetic disks, optical disks, or tape. Such additional storage is illustrated in FIG. 17 by a removable storage device 1709 and a non-removable storage device 1710.

As stated above, a number of program modules and data files may be stored in the system memory 1704. While executing on the processing unit 1702, the program modules 1706 (e.g., spreadsheet application program 104) may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 17 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1700 may also have one or more input device(s) 1712 such as a keyboard, a mouse, a pen, a sound or voice input device, a touch or swipe input device, etc. The output device(s) 1714 such as a display, speakers, a printer, etc. may also be included. The aforementioned devices are examples and others may be used. The computing device 1700 may include one or more communication connections 1716 allowing communications with other computing devices 1750. Examples of suitable communication connections 1716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1704, the removable storage device 1709, and the non-removable storage device 1710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1700. Any such computer storage media may be part of the computing device 1700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 18A:
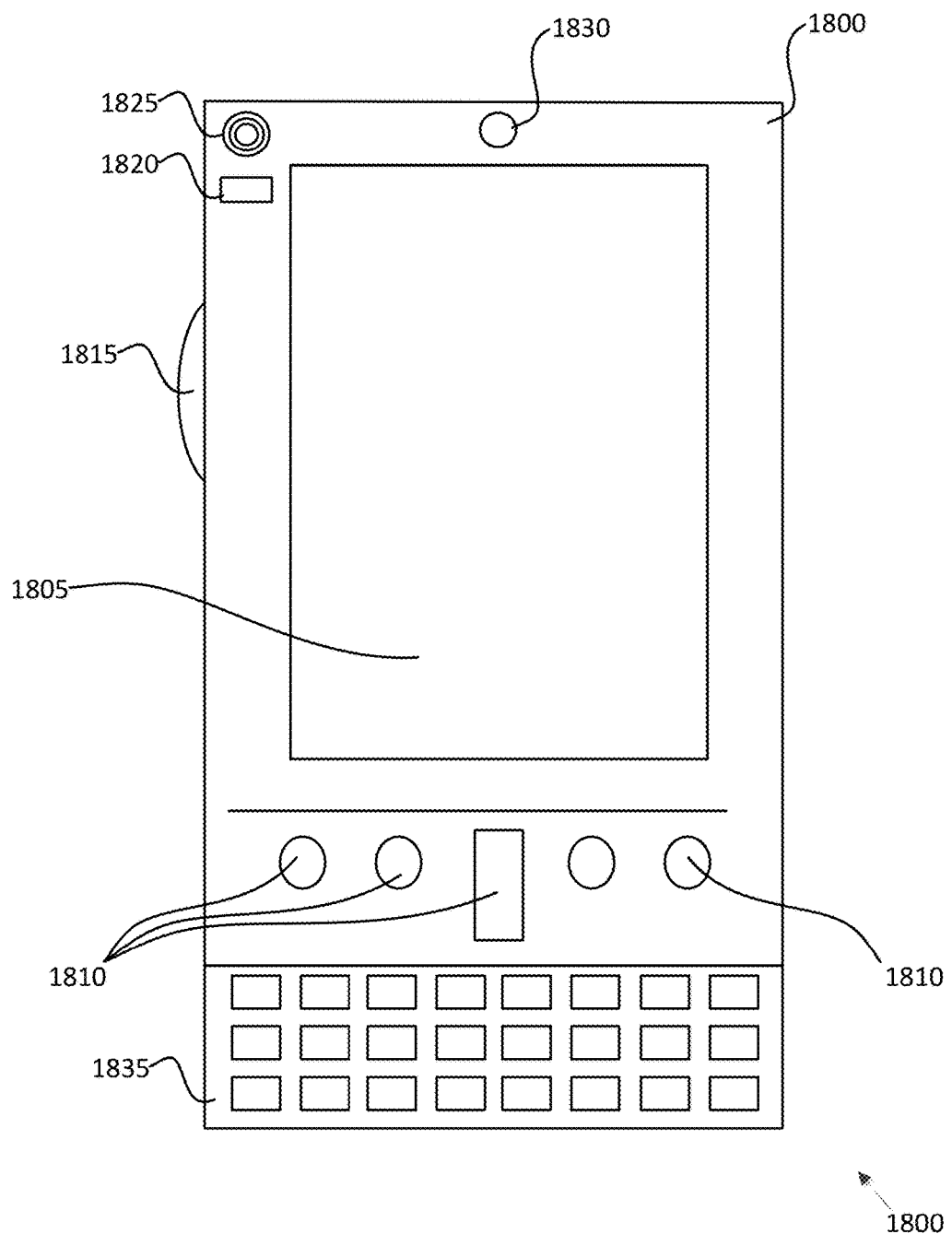
FIG. 18A and FIG. 18B are simplified block diagrams of a mobile computing device with which aspects of the present disclosure may be practiced.
Figure 18B:
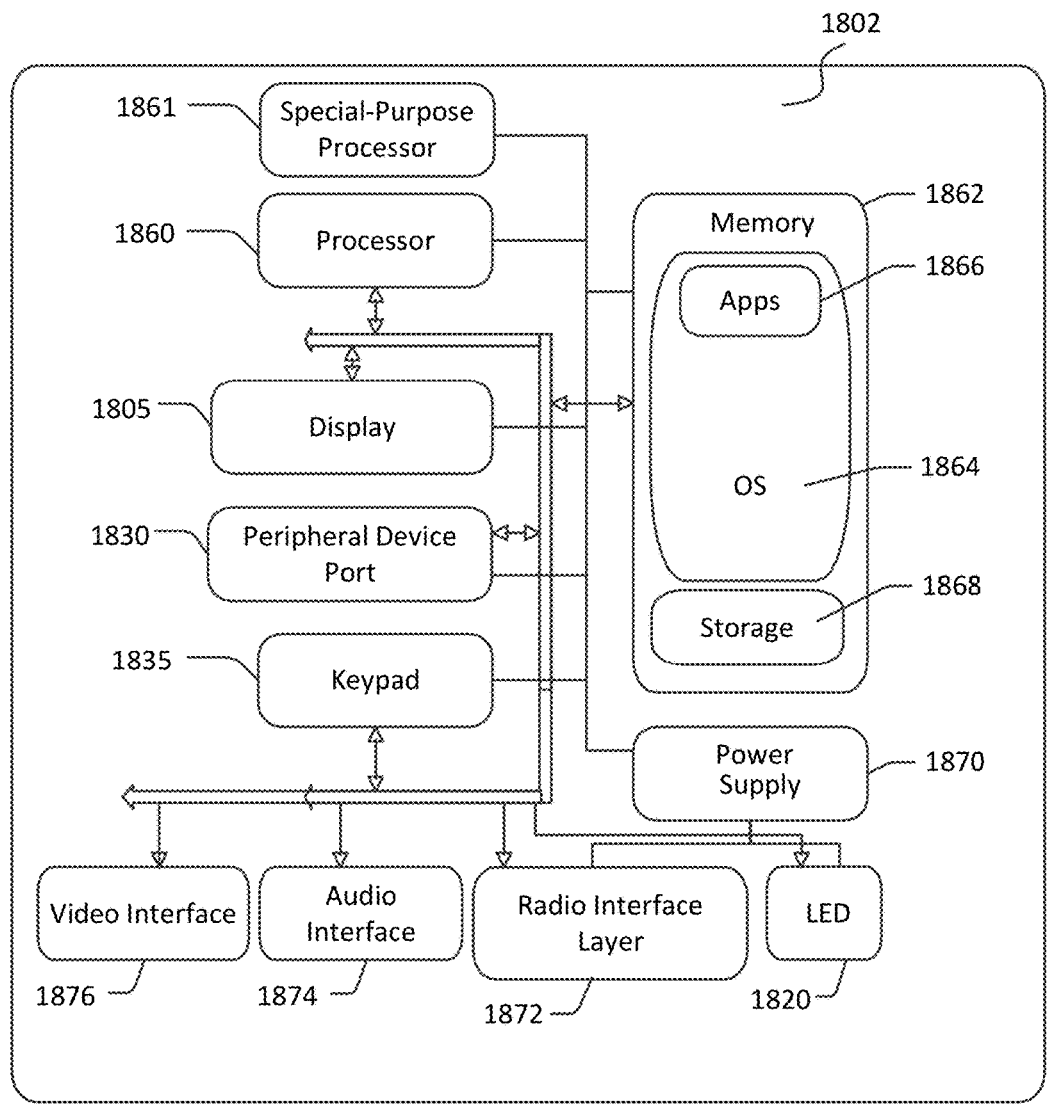

FIGS. 18A and 18B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 18A, one aspect of a mobile computing device 1800 for implementing the aspects is illustrated. In a basic configuration, the mobile computing device 1800 is a handheld computer having both input elements and output elements. The mobile computing device 1800 typically includes a display 1805 and one or more input buttons 1810 that allow the user to enter information into the mobile computing device 1800. The display 1805 of the mobile computing device 1800 may also function as an input device (e.g., a touch screen display). If included, an optional side input element 1815 allows further user input. The side input element 1815 may be a rotary switch, a button, or any other type of manual input element. In alternative aspects, mobile computing device 1800 may incorporate more or less input elements. For example, the display 1805 may not be a touch screen in some embodiments. In yet another alternative embodiment, the mobile computing device 1800 is a portable phone system, such as a cellular phone. The mobile computing device 1800 may also include an optional keypad 1835. Optional keypad 1835 may be a physical keypad or a "soft" keypad generated on the touch screen display. In various embodiments, the output elements include the display 1805 for showing a graphical user interface (GUI), a visual indicator 1820 (e.g., a light emitting diode), and/or an audio transducer 1825 (e.g., a speaker). In some aspects, the mobile computing device 1800 incorporates a vibration transducer for providing the user with tactile feedback. In yet another aspect, the mobile computing device 1800 incorporates input and/or output ports, such as an audio input (e.g., a microphone jack), an audio output (e.g., a headphone jack), and a video output (e.g., a HDMI port) for sending signals to or receiving signals from an external device.

FIG. 18B is a block diagram illustrating the architecture of one aspect of a mobile computing device. That is, the mobile computing device 1800 can incorporate a system (e.g., an architecture) 1802 to implement some aspects. In one embodiment, the system 1802 is implemented as a "smart phone" capable of running one or more applications (e.g., browser, e-mail, calendaring, contact managers, messaging clients, games, and media clients/players). In some aspects, the system 1802 is integrated as a computing device, such as an integrated personal digital assistant (PDA) and wireless phone.

One or more application programs 1866 may be loaded into the memory 1862 and run on or in association with the operating system 1864. Examples of the application programs include phone dialer programs, e-mail programs, personal information management (PIM) programs, word processing programs, spreadsheet programs, Internet browser programs, messaging programs, and so forth. The system 1802 also includes a non-volatile storage area 1868 within the memory 1862. The non-volatile storage area 1868 may be used to store persistent information that should not be lost if the system 1802 is powered down. The application programs 1866 may use and store information in the non-volatile storage area 1868, such as e-mail or other messages used by an e-mail application, and the like. A synchronization application (not shown) also resides on the system 1802 and is programmed to interact with a corresponding synchronization application resident on a host computer to keep the information stored in the non-volatile storage area 1868 synchronized with corresponding information stored at the host computer. As should be appreciated, other applications may be loaded into the memory 1862 and run on the mobile computing device 1800, including the instructions for providing a spreadsheet application program.

The system 1802 has a power supply 1870, which may be implemented as one or more batteries. The power supply 1870 might further include an external power source, such as an AC adapter or a powered docking cradle that supplements or recharges the batteries.

The system 1802 may also include a radio interface layer 1872 that performs the function of transmitting and receiving radio frequency communications. The radio interface layer 1872 facilitates wireless connectivity between the system 1802 and the "outside world," via a communications carrier or service provider. Transmissions to and from the radio interface layer 1872 are conducted under control of the operating system 1864. In other words, communications received by the radio interface layer 1872 may be disseminated to the application programs 1866 via the operating system 1864, and vice versa.

The visual indicator 1820 may be used to provide visual notifications, and/or an audio interface 1874 may be used for producing audible notifications via the audio transducer 1825. In the illustrated embodiment, the visual indicator 1820 is a light emitting diode (LED) and the audio transducer 1825 is a speaker. These devices may be directly coupled to the power supply 1870 so that when activated, they remain on for a duration dictated by the notification mechanism even though the processor 1860 and other components might shut down for conserving battery power. The LED may be programmed to remain on indefinitely until the user takes action to indicate the powered-on status of the device. The audio interface 1874 is used to provide audible signals to and receive audible signals from the user. For example, in addition to being coupled to the audio transducer 1825, the audio interface 1874 may also be coupled to a microphone to receive audible input, such as to facilitate a telephone conversation. In accordance with embodiments of the present disclosure, the microphone may also serve as an audio sensor to facilitate control of notifications, as will be described below. The system 1802 may further include a video interface 1876 that enables an operation of an on-board camera 1830 to record still images, video stream, and the like.

A mobile computing device 1800 implementing the system 1802 may have additional features or functionality. For example, the mobile computing device 1800 may also include additional data storage devices (removable and/or non-removable) such as, magnetic disks, optical disks, or tape. Such additional storage is illustrated in FIG. 18B by the non-volatile storage area 1868.

Data/information generated or captured by the mobile computing device 1800 and stored via the system 1802 may be stored locally on the mobile computing device 1800, as described above, or the data may be stored on any number of storage media that may be accessed by the device via the radio interface layer 1872 or via a wired connection between the mobile computing device 1800 and a separate computing device associated with the mobile computing device 1800, for example, a server computer in a distributed computing network, such as the Internet. As should be appreciated such data/information may be accessed via the mobile computing device 1800 via the radio interface layer 1872 or via a distributed computing network. Similarly, such data/information may be readily transferred between computing devices for storage and use according to well-known data/information transfer and storage means, including electronic mail and collaborative data/information sharing systems.

Figure 19:
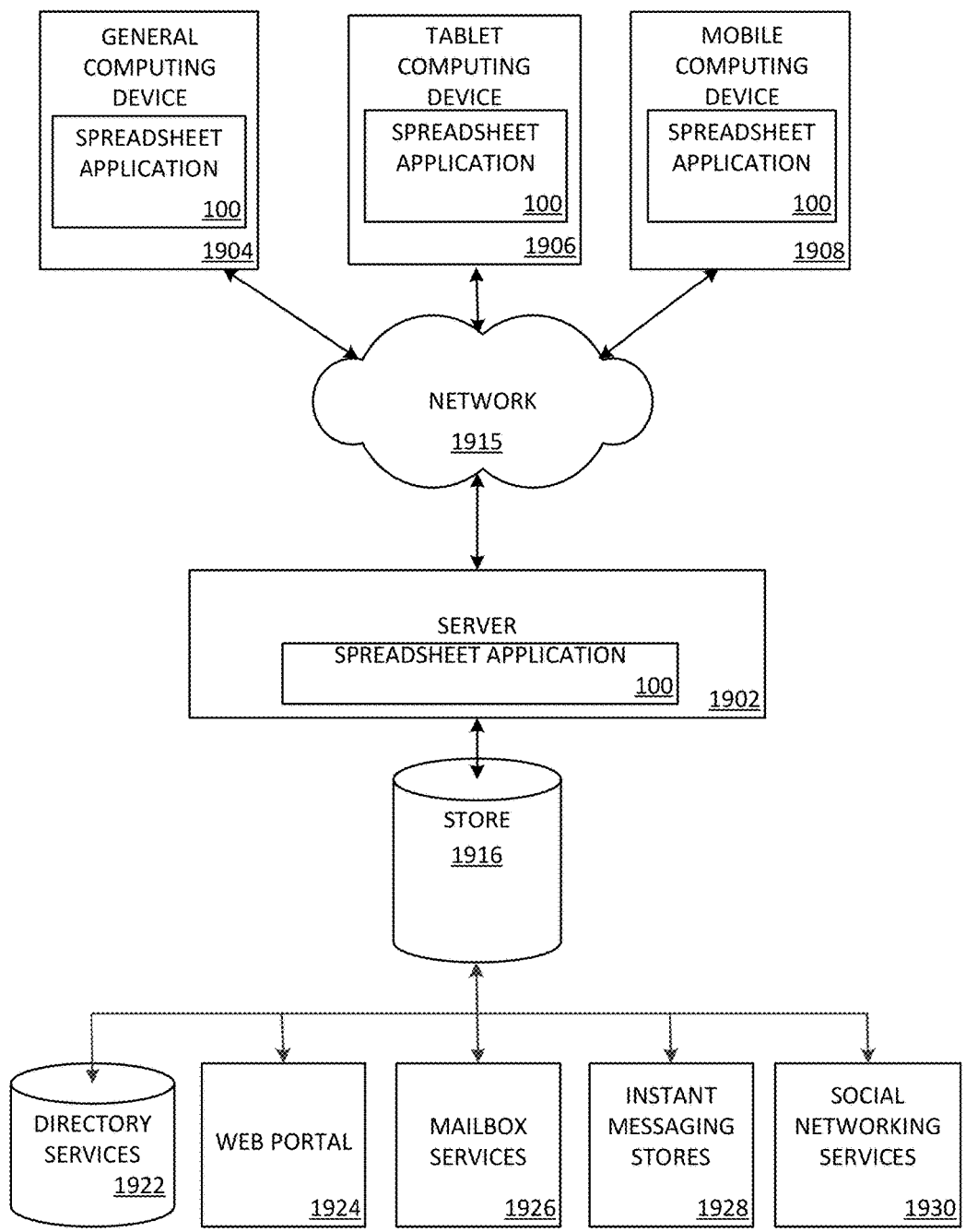
FIG. 19 is a simplified block diagram of a distributed computing system in which aspects of the present disclosure may be practiced.

FIG. 19 illustrates one aspect of the architecture of a system for processing data received at a computing system from a remote source, such as a personal computer 1904, tablet computing device 1906, or mobile computing device 1908, as described above. Content displayed at server device 1902 may be stored in different communication channels or other storage types. For example, various documents may be stored using a directory service 1922, a web portal 1924, a mailbox service 1926, an instant messaging store 1928, or a social networking site 1930. The spreadsheet application 104 may be employed by a client that communicates with server device 1902, and/or the spreadsheet application 104 may be employed by server device 1902. The server device 1902 may provide data to and from a client computing device such as a personal computer 1904, a tablet computing device 1906 and/or a mobile computing device 1908 (e.g., a smart phone) through a network 1915. By way of example, the computer system described above may be embodied in a personal computer 1904, a tablet computing device 1906 and/or a mobile computing device 1908 (e.g., a smart phone). Any of these embodiments of the computing devices may obtain content from the store 1916, in addition to receiving graphical data useable to be either pre-processed at a graphic-originating system, or post-processed at a receiving computing system.

Figure 20:
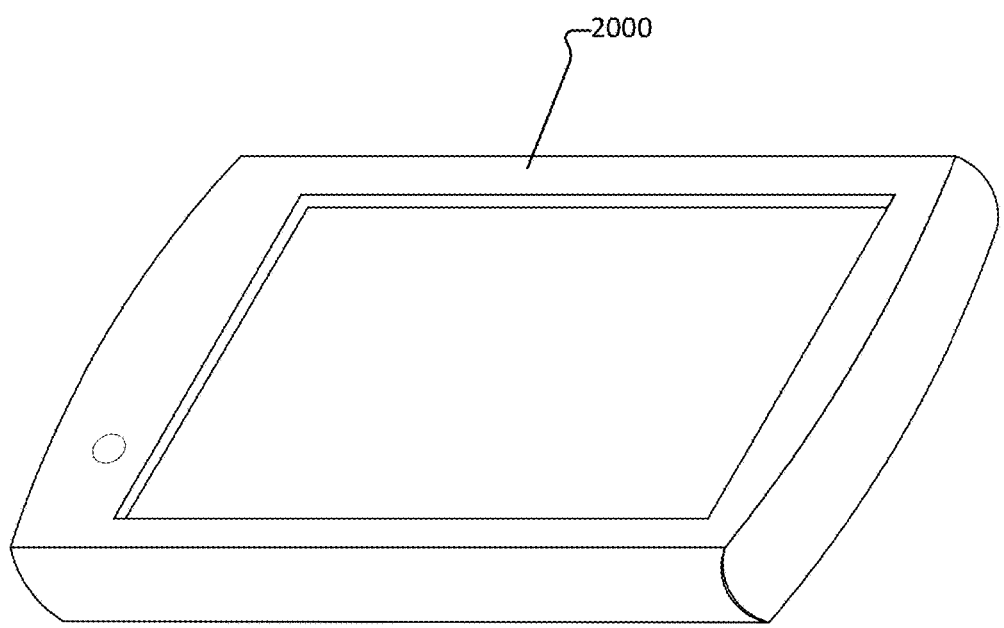
FIG. 20 illustrates a tablet computing device for executing one or more aspects of the present disclosure.

FIG. 20 illustrates an exemplary tablet computing device 2000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for connecting one or more variables of a math equation stored in a first cell of a spreadsheet with data stored in other cells of the spreadsheet, the method comprising: receiving the math equation, wherein the math equation includes a variable; providing a user interface specific to the math equation, wherein the user interface includes a first input field for referencing one or more cells for populating the variable and a second input field for referencing one or more cells for displaying a solution of the math equation; receiving a reference to a second cell in the first input field; and a reference to one of the first cell or a third cell in the second input field of the user interface; populating the variable with data stored in the second cell;
and calculating and displaying the solution in one of the first cell or the third cell of the spreadsheet.

2. The method of claim 1, wherein the second cell further includes a second math equation, the second math equation including a second variable.

3. The method of claim 2, further comprising: for the second variable, receiving a reference to a fourth cell in a third input field of the user interface; and populating the second variable with data stored in the fourth cell.

4. The method of claim 1, wherein the math equation further includes a second variable, further comprising: for the second variable, receiving a reference to a fourth cell in a third input field of the user interface; and populating the second variable with data stored in the fourth cell.

5. The method claim 1, wherein a calculation engine of the spreadsheet application populates the variable.

6. The method of claim 1, wherein receiving the reference to the second cell further comprises receiving the reference to a portion of the second cell.

7. The method of claim 6, wherein the portion of the second cell further comprises a reference to a portion of an equation stored in the second cell.

8. The method of claim 1 wherein solving the math equation is performed by a math engine of the spreadsheet application.

9. The method of claim 1, wherein the user interface provides a plurality of dropdown menus for solving the math equation.

10. The method of claim 9, wherein the solution is provided in the user interface.

11. The method of claim 9, wherein the user interface displays each step for solving the math equation.

12. The method of claim 1 wherein the solution replaces the math equation stored in the first cell of the spreadsheet.

13. A system comprising: at least one processing unit; and at least one memory storing computer executable instructions that, when executed by the at least one processing unit, cause the system to perform a method for displaying dependencies among cells of a spreadsheet, the method comprising: receiving a math equation at a first cell of the spreadsheet, wherein the math equation includes a variable; providing a user interface specific to the math equation, wherein the user interface includes a first input field for referencing one or more cells for populating the variable and a second input field for referencing one or more cells for displaying a solution of the math equation; receiving a reference to a second cell in the first input field and a reference to one of the first cell or a third cell in the second input field of the user interface; populating the variable with data stored in the second cell; and displaying a dependency from the first cell to the second cell.

14. The system of claim 13, wherein displaying the dependency comprises displaying an arrow from the first cell to the second cell.

15. The system of claim 13, further comprising: wherein the data comprises a second math equation including a second variable; wherein receiving a reference to the second cell in the first input field includes receiving a reference to the second variable in the first input field; and displaying a second dependency from the variable to the second variable.

16. The system of claim 13, further comprising: wherein the data comprises a second math equation including a second variable; for the second variable, receiving a reference to a fourth cell in a third input field of the user interface, wherein the fourth cell stores data; and displaying a second dependency from the second cell to the fourth cell.

17. The system of claim 16, wherein the dependency and the second dependency are displayed simultaneously.

18. A computer-implemented method for receiving an equation in a math display mode of a spreadsheet application, the method comprising: receiving, a math equation, wherein the math equation includes a variable; parsing the math equation; providing a user interface specific to the math equation, wherein the user interface includes a first dropdown field for selecting one or more cells for populating the variable and a second dropdown field for selecting one or more cells for displaying a solution of the math equation; receiving a first selection of a first cell in the first dropdown field and a second selection of a second cell in the second dropdown field; inserting a first reference to the first cell and a second reference to the second cell in the math equation; and displaying the math equation in a third cell of the spreadsheet.

19. The computer-implemented method of claim 18, further comprising: populating the variable with data stored in the first cell; and displaying the solution of the math equation in the second cell.

20. The computer-implemented method of claim 19, wherein displaying the solution of the math equation further comprises displaying each step of the solution.

* * * * *